(12) United States Patent
Hasegawa et al.

(10) Patent No.: US 7,080,724 B2
(45) Date of Patent: Jul. 25, 2006

(54) START CONTROL DEVICE FOR VEHICLE

(75) Inventors: Yoshio Hasegawa, Chiryu (JP); Akira Hoshino, Nishikamo-gun (JP); Yoshikazu Tanaka, Toyota (JP); Katsumi Nakatani, Nishikamo-gun (JP); Tooru Matsubara, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 32 days.

(21) Appl. No.: 10/833,056

(22) Filed: Apr. 28, 2004

(65) Prior Publication Data

US 2004/0231951 A1 Nov. 25, 2004

(30) Foreign Application Priority Data

May 23, 2003 (JP) ............................. 2003-146722
Jul. 28, 2003 (JP) ............................. 2003-202452

(51) Int. Cl.
*B60W 10/10* (2006.01)
(52) U.S. Cl. .................... 192/220; 192/221; 192/13 R; 477/93
(58) Field of Classification Search .............. 192/220, 192/220.1; 477/93, 114
See application file for complete search history.

(56) References Cited

U.S. PATENT DOCUMENTS

| | | | | |
|---|---|---|---|---|
| 5,052,531 A | * | 10/1991 | Bota | ................. 192/219.1 |
| 5,519,996 A | | 5/1996 | Ko | |
| 5,692,990 A | * | 12/1997 | Tsukamoto et al. | ............ 477/93 |
| 5,911,646 A | | 6/1999 | Tsutsui et al. | |
| 6,338,398 B1 | | 1/2002 | Eguchi | |
| 6,411,881 B1 | * | 6/2002 | Thomas | ........................ 701/67 |
| 2001/0049575 A1 | | 12/2001 | Muratomi | |
| 2005/0020403 A1 | * | 1/2005 | Hasegawa et al. | ............ 477/92 |

FOREIGN PATENT DOCUMENTS

| | | |
|---|---|---|
| DE | 19625919 | 1/1998 |
| DE | 10154633 | 5/2003 |
| EP | 0375162 | 6/1990 |
| EP | 1040957 | 10/2000 |
| GB | 2392968 | 3/2004 |
| JP | 5-6187 YZ | 2/1993 |
| JP | 05087236 A * | 4/1993 |
| JP | 7-144625 A | 6/1995 |
| JP | 9-202159 A | 8/1997 |
| JP | 11-230327 A | 8/1999 |
| JP | 2000-257656 A | 9/2000 |
| JP | 2000-313253 A | 11/2000 |

* cited by examiner

*Primary Examiner*—Richard M. Lorence
(74) *Attorney, Agent, or Firm*—Oblon, Spivak, McClelland, Maier & Neustadt P.C.

(57) ABSTRACT

A start control device is provided for a vehicle that is subjected to neutral control for releasing a coupling element of an automatic transmission when the vehicle is stopped with predetermined conditions satisfied while the automatic transmission is in a forward drive position. The start control device detects a braking operation performed by the driver of the vehicle or a braking condition during the neutral control, and controls the braking force of the vehicle when the vehicle returns from the neutral control, based on the detected braking operation or the braking condition during the neutral control.

11 Claims, 13 Drawing Sheets

FIG. 2

| | C1 | C2 | C3 | C4 | B1 | B2 | B3 | B4 | F0 | F1 | F2 | F3 |
|---|---|---|---|---|---|---|---|---|---|---|---|---|
| P | | | | | | | | | | | | |
| R | | | O | | ◎ | | | O | | O | | |
| N | | | | | | | | | | | | |
| 1st | O | | | ◎ | | | | ◎ | O | | | O |
| 2nd | O | | | ◎ | | ◎ | O | | O | O | O | |
| 3rd | O | | O | ◎ | ◎ | | △ | | O | O | | |
| 4th | O | O | △ | ◎ | | | △ | | O | | | |
| 5th | △ | O | O | | O | | △ | | | | | |
| 6th | △ | O | | | △ | O | △ | | | | | |

O: ENGAGED
◎: ENGAGED WHEN ENGINE BRAKE IS APPLIED
△: ENGAGED BUT NOT RELATED TO POWER TRANSMISSION

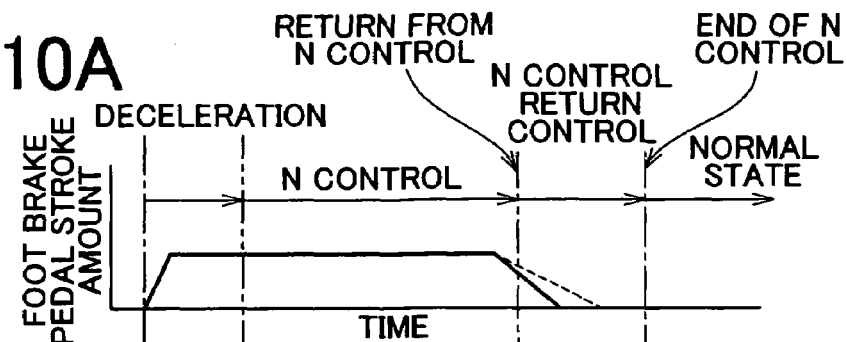
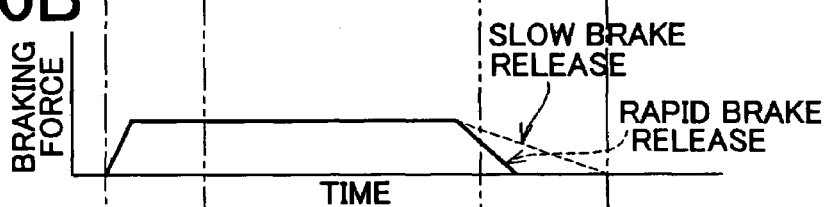
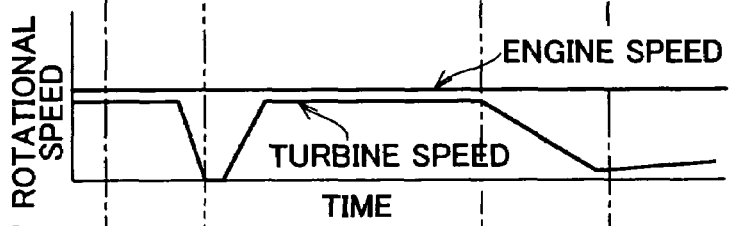
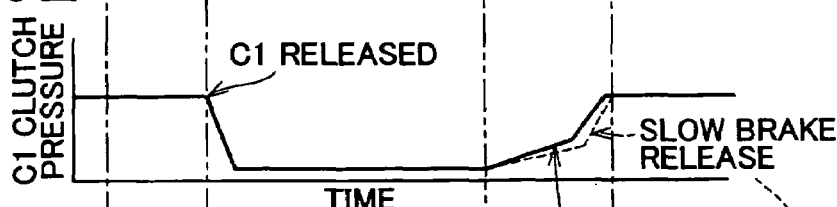
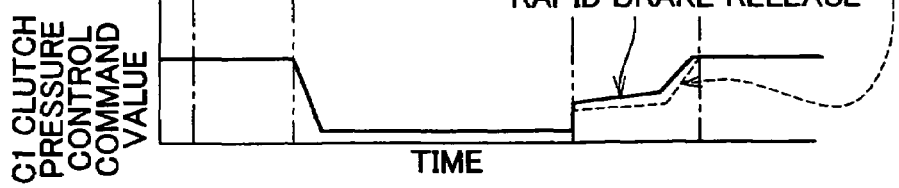

C1 RETURN INITIAL PRESSURE =
C1 NORMAL RETURN INITIAL PRESSURE −
RETURN CONTROL CORRECTION PRESSURE

START CONTROL DEVICE FOR VEHICLE

INCORPORATION BY REFERENCE

The disclosures of Japanese Patent Applications No. 2003-146722 filed on May 23, 2003 and No. 2003-202452 filed on Jul. 28, 2003, each including the specification, drawings and abstract, are incorporated herein by reference in their entireties.

BACKGROUND OF THE INVENTION

1. Field of the Invention

The invention generally relates to a start control device for a vehicle in which an automatic transmission is installed, and, more particularly, to a start control device of the vehicle in which neutral control is performed.

2. Description of Related Art

The automatic transmission installed in the vehicle is connected to the engine via a torque converter, or the like, and has a speed changing mechanism having a plurality of power transmission paths. The automatic transmission is arranged to automatically switch the power transmission paths, or automatically change the speed ratio or gear position, based on, for example, the accelerator pedal position and the vehicle speed. Generally, the vehicle having the automatic transmission is provided with a shift lever that is operated by the driver. In operation, the shift lever is operated so as to establish a shift position or range (for example, reverse drive position, neutral position, forward drive position, etc.) based on the selected position of the shift lever, and automatic shift control is performed within the range of the thus established shift position (which is normally the forward drive position).

When the vehicle having such an automatic transmission is in a stopped state with the forward drive position being established, driving force is transmitted from the idling engine to the transmission via the torque converter and is then transmitted to the wheels, thus causing a so-called creep phenomenon. The creep phenomenon may be very useful under certain conditions, such as when the vehicle that is stopped on an uphill is to be smoothly started, but may be an unnecessary or undesirable phenomenon when the vehicle is to be kept stopped. In the latter case, the vehicle brakes are applied so as to suppress or reduce the creeping force from the engine, resulting in a reduction in the fuel efficiency of the engine.

When the vehicle is in a stopped state in which the brake pedal is depressed to apply the brakes and the acceleration pedal is almost fully released (i.e., the throttle valve is almost fully closed) while the forward drive position is established, it has been proposed to place the transmission in a substantially neutral state while keeping the forward drive position established, in an attempt to improve the fuel economy.

Numerous techniques involving such neutral control and techniques for controlling the brakes during transition from the stopped state to starting of the vehicle have been proposed and disclosed.

For example, Japanese Laid-open Patent Publication No. 7-144625 (JP-A-7-144625) discloses a stop/start control device of a vehicle in which an automatic transmission is installed, which control device reduces as much loss as possible when the vehicle is stopped with the forward drive (D) position established, while automatically applying the brakes during stop of the vehicle, and also realizes a good start of the vehicle after the stop. The stop/start control device includes (a) running condition detecting means for detecting running conditions of the vehicle, (b) the automatic transmission whose shift position is controlled based on the vehicle running conditions detected by the running condition detecting means, (c) braking means for applying brakes to the wheels of the vehicle with the braking force that depends upon the driver's operation of the brake pedal, (d) braking force adjusting means capable of changing the braking force of the braking means independently of the operation of the brake pedal, (e) stop detecting means for detecting the stopped state of the vehicle based on the vehicle running conditions detected by the running condition detecting means, (f) start detecting means for detecting a start of the vehicle based on the vehicle running conditions detected by the running condition detecting means, and (g) a controller that reduces the hydraulic pressure of the automatic transmission while keeping the braking force applied to the wheels at a predetermined value by controlling the braking force adjusting means when the stopped state of the vehicle is detected by the stop detecting means, and returns the hydraulic pressure to a level prior to the reduction while releasing the braking force kept by the braking force adjusting means when the start of the vehicle is detected by the start detecting means.

With the stop/start control device of the vehicle as described above, when a stop of the vehicle is detected by the stop detecting means, the controller reduces the hydraulic pressure of the automatic transmission, and keeps the braking force applied to the wheels at a predetermined value through the braking force adjusting means. If a start of the vehicle is subsequently detected by the start detecting means, the controller resumes the hydraulic pressure of the automatic transmission, and releases the braking force applied to the wheels, through the braking force adjusting means. Since the hydraulic pressure of the automatic transmission is reduced during stop of the vehicle, losses in an oil pump, torque converter and other devices of the hydraulic system can be reduced even if the automatic transmission is placed in the forward drive (D) position during the stop, thus assuring improved fuel economy, and noise due to idling of the engine can also be reduced.

Japanese Laid-open Patent Publication No. 9-202159 (JP-A-9-202159) discloses a braking force control device for a vehicle equipped with a starting clutch, which device prevents the vehicle from moving backward when it is started on a slope. The braking force control device is provided in the vehicle equipped with the starting clutch, wherein the starting clutch is placed in a half-engaged state at an extremely low vehicle speed in the drive position (D range) so that the driving force is given to the vehicle, and the engaging state of the starting clutch is controlled in accordance with the braking operation by the driver (i.e., the driver's operation of the brake pedal), such that the driving force is reduced when the brake pedal is depressed, as compared with the time when the brake pedal is released. The braking force control device includes (a) braking force applying means for applying the braking force to the vehicle irrespective of the driver's operation of the brake pedal, (b) driving force detecting means for determining whether the driving force has changed from a small level to a predetermined large level through driving force control of the starting clutch performed when the brake pedal is released from the depressed state, and (c) braking force control means for controlling the braking force applying means so as to keep the braking force until the driving force detecting means determines that the driving force has reached the predetermined large level.

With the braking force control device as described above, the driving force is controlled to be small when the brake pedal is depressed. When the brake pedal is released from the depressed state, it is determined whether the driving force has been actually increased to a sufficiently large level as a result of the release of the brake pedal, as compared with the previous controlled state in which the driving force was reduced through the driving force control of the starting clutch. Since the braking force control device keeps the braking force until it is determined that the driving force has reached the large level, the vehicle is surely prevented from moving backward upon a start on a slope, without changing the heat resistance of the clutch and the vehicle starting response.

Japanese Laid-open Patent Publication No. 2000-313253 (JP-A-2000-313253) discloses a control device for a vehicle capable of automatically stopping and restarting the engine, which device ensures a good start of the vehicle so that the driver is less likely to feel an abrupt start of the vehicle while preventing the vehicle from rolling or moving backward. The control device is operable when the engine is re-started in the vehicle in which the engine is automatically stopped when certain stop conditions are satisfied, and the engine that was automatically stopped is re-started when certain restart conditions are satisfied. The control device includes (a) holding means for holding the braking force of the vehicle during an automatic stop of the engine, and (b) detecting means for detecting a recovery condition of the driving force of the vehicle upon a restart of the engine, and is characterized by reducing the braking force of the vehicle in accordance with the recovery condition of the driving force of the vehicle when the engine that has been automatically stopped is restarted.

The control device for the vehicle as described above is able to provide appropriate timing of recovery of the driving force and release of the brakes by controlling (reducing) the braking force in accordance with the recovery of the driving force. As a result, the driver is less likely to feel an abrupt start of the vehicle, and the vehicle is prevented from moving backward. The control device also ensures a good start of the vehicle.

Japanese Laid-open Patent Publication No. 11-230327 (JP-A-11-230327) discloses a drive control device of a vehicle, which controls the engagement speed of a clutch when leaving neutral control, in accordance with the level of the driver's demand for starting, thus assuring improved drivability or response to the starting operation of the driver. The drive control device of the vehicle executes neutral control for placing the automatic transmission in a neutral state if predetermined conditions are satisfied even when the forward drive position is selected as the shift position of the automatic transmission, and leaves the neutral control when any of the predetermined conditions is not satisfied. The drive control device includes (a) brake application detecting means for detecting the condition of application of the brakes during neutral control, (b) accelerator position detecting means for detecting the amount of depression of the accelerator pedal, and (c) clutch pressure control means for raising the hydraulic pressure of the clutch when the brakes are released, and increasing the speed of raising the hydraulic pressure as the operating amount of the accelerator pedal increases, based on a signal of the brake application detecting means and a signal of the accelerator position detecting means.

Generally, when the driver performs a starting operation (e.g., when the accelerator pedal is depressed), the driver may wish to quickly start the vehicle, or slowly start the vehicle at a speed slightly higher than the creep speed, or start the vehicle at an intermediate speed. Thus, the driver's demand for starting the vehicle has different levels. With the drive control device of the vehicle as described above, the engagement speed of the starting clutch is varied depending upon the amount of depression of the accelerator pedal. Accordingly, the clutch can be slowly engaged when the amount of depression of the accelerator pedal is small, and can be rapidly engaged when the amount of depression of the accelerator pedal is large. Thus, the drive control device is able to perform appropriate control that meets the driver's demand.

However, the above-described vehicle control performed upon cancellation of neutral control has various problems as follows.

The stop/start control device as disclosed in JP-A-7-144625 only reduces the line pressure during a stop of the vehicle so as to reduce pressure losses in the oil pump and the torque converter even when the forward drive (D) position is selected, to the same extent as in the case where the neutral (N) position is selected. Namely, the engagement pressure of the torque converter is reduced with the reduction of the line pressure, and the vehicle is started while the creep torque is reduced. In this case, if the wheel brakes are not suitably released, the vehicle is not smoothly started, and, for example, the vehicle that is on an uphill may roll or move backward.

The braking force control device as disclosed in JP-A-9-202159 does not involve neutral control. Rather, this control device only places the starting clutch in a half-engaged state in accordance with the braking operation when the vehicle is stopped with the forward drive (D) position selected, and keeps the braking force after a release of the brake pedal until the driving force of the starting clutch reaches a predetermined large level, to thus prevent the vehicle on an uphill from moving backward. Then, the braking force is reduced when the driving force of the starting clutch reaches the large level, which is determined by directly detecting the engagement pressure of the starting clutch or determining that a predetermined time has passed since the engagement pressure of the starting clutch starts being increased. Thus, the braking force is only controlled depending upon the driving force transmitted through the starting clutch, irrespective of how the driver released the brake pedal, or irrespective of the condition of application of the brakes during stop of the vehicle.

In the system in which the engine is automatically stopped during idling, the control device as disclosed in JP-A-2000-313253 holds the braking force of the vehicle during the automatic stop of the engine, and reduces the braking force upon a restart of the engine in accordance with the recovery condition of the vehicle driving force, so as to prevent backward rolling of the vehicle and assure a good start of the vehicle. While the control device as disclosed in this publication may be applied to neutral control, the braking force is controlled only depending upon the driving force of the vehicle, irrespective of how the driver released the brakes, or irrespective of the condition of application of the brakes during the stop of the vehicle, as in the case of the braking force control device as disclosed in JP-A-9-202159.

The drive control device of the vehicle as disclosed in JP-A-11-230329 merely raises the hydraulic pressure of the clutch when the brakes are released upon return from neutral control, and also increases the speed of raising the hydraulic pressure as the operating amount of the accelerator pedal increases, so as to improve drivability or response to the starting operation of the driver. While the clutch pressure can be controlled in accordance with the operation of the accelerator pedal by the driver, the control device disclosed in this publication is not arranged to perform control in accordance with the braking operation of the driver (e.g., the braking operation during neutral control and the brake releasing operation at the time of cancellation of neutral control).

SUMMARY OF THE INVENTION

It is therefore an object of the invention to provide a start control device for a vehicle, which is able to perform desirable vehicle start control, based on the condition of release of the brakes upon return from neutral control, or the condition of application of the brakes during neutral control.

To accomplish the above and/or other object(s), there is provided according to a first aspect of the invention a start control device for a vehicle in which an automatic transmission having a coupling element that is engaged upon a start of the vehicle is installed, the vehicle being subjected to neutral control for releasing the coupling element when the vehicle is stopped with predetermined conditions satisfied while the automatic transmission is in a forward drive position. The start control device includes a detecting unit that detects a braking operation performed by a driver of the vehicle, and a control unit that controls a braking force of the vehicle when the vehicle returns from the neutral control, based on the braking operation detected by the detecting unit.

According to the first aspect of the invention, when the driver quickly releases the brakes upon return from the neutral control, for example, the control unit slowly reduces the braking force of the vehicle during return from the neutral control. With this arrangement, even if the driver performs a quick action to release the brakes for a quick start of the vehicle, the actual braking force of the vehicle is reduced at a low rate or the period of time for which the braking force is reduced is increased, so that engagement shock upon engagement of the coupling element or abnormal noise arising from the vehicle brakes can be prevented or suppressed. When the driver slowly releases the brakes upon return from the neutral control, on the other hand, the control unit operates to reduce the braking force of the vehicle in accordance with the releasing operation or at a higher speed than that of the releasing operation during return from the neutral control. Thus, when the driver's operation to reduce the braking force is too slow, the actual braking force of the vehicle is relatively rapidly reduced so that the vehicle can be smoothly started without giving a feeling of tardiness when returning from the neutral control. Thus, the start control device for the vehicle according to the above aspect of the invention is able to perform improved vehicle start control based on the condition in which the brakes are released upon return from the neutral control.

In one embodiment of the first aspect of the invention, the control unit controls the braking force during return from the neutral control, based on an operation to release brakes upon return from the neutral control, which operation is detected by the detecting unit as the braking operation performed by the driver.

According to the embodiment as described above, the braking force is controlled during return from the neutral control based on the driver's operation to release the brakes upon return from the neutral control. Thus, the start control device is able to perform improved vehicle start control, based on the condition in which the brakes are released upon return from the neutral control.

In the start control device according to the above embodiment of the invention, the control unit may control the braking force during return from the neutral control, based on the speed of releasing the brakes upon return from the neutral control.

With the above arrangement, the braking force is controlled during return from the neutral control based on the speed at which the driver releases the brakes or brake pedal when the vehicle returns from the neutral control. For example, the braking force is controlled to be slowly reduced if the brakes are released at a high speed, and is controlled to be rapidly reduced if the brakes are released at a low speed. Thus, the start control device is able to perform improved vehicle start control, based on the condition in which the brakes are released upon return from the neutral control.

In the start control device as described just above, the control unit may control the braking force such that a period of time for which the braking force is reduced during return from the neutral control is increased as the speed of releasing the brakes upon return from the neutral control is higher.

In the above case, the braking force is controlled to be slowly reduced as the speed of the driver's operation to release the brakes upon return from the neutral control increases. Thus, the start control device is able to perform improved vehicle start control, without suffering from engagement shock and abnormal noise from the brakes.

According to a second aspect of the invention, there is provided a start control device for a vehicle in which an automatic transmission having a coupling element that is engaged upon a start of the vehicle is installed, the vehicle being subjected to neutral control for releasing the coupling element when the vehicle is stopped with predetermined conditions satisfied while the automatic transmission is in a forward drive position. The start control device includes a detecting unit that detects a braking condition during the neutral control, and a control unit that controls a braking force of the vehicle when the vehicle returns from the neutral control, based on the braking condition detected by the detecting unit.

According to the second aspect of the invention, the braking condition during the neutral control is detected by the detecting unit. If the braking force during the neutral control is small, for example, the control unit operates to slowly reduce the braking force of the vehicle during return from the neutral control. With this arrangement, where the braking force applied during the neutral control is small, the actual braking force of the vehicle is slowly reduced or the period of time during which the braking force is reduced is increased, so that engagement shock that would occur upon engagement of the coupling element and abnormal noise arising from the vehicle brakes can be prevented or suppressed even if it takes time to engage the coupling element. If the braking force during the neutral control is large, on the other hand, the control unit operates to rapidly reduce the braking force of the vehicle during return from the neutral control. With this arrangement, where the braking force applied during the neutral control is large, the actual braking force of the vehicle is rapidly reduced, so that the vehicle can be smoothly started without giving a feeling of tardiness when returning from the neutral control. Thus, the start control device for the vehicle according to the second aspect of the invention is able to perform improved vehicle start control based on the braking condition during the neutral control.

In one embodiment of the second aspect of the invention, the control unit controls the speed of reduction of the braking force during return from the neutral control. According to this embodiment, the speed of reduction of the braking force is controlled based on the braking condition during the neutral control. More specifically, the braking force reduction speed is reduced as the braking force applied during the neutral control is smaller, and the reduction speed is increased as the braking force applied during the neutral control is larger, so that desirable vehicle start control can be performed.

In the embodiment as described just above, the control unit may control the braking force such that a period of time for which the braking force is reduced during return from the neutral control is increased as the braking force during the neutral control detected by the detecting unit is smaller. In this case, the speed of reduction of the braking force is reduced if the braking force during the neutral control is small so that the time for which the braking force is reduced is increased, whereby the vehicle on an uphill is prevented from rolling or moving backward.

According to a third aspect of the invention, there is provided a start control device for a vehicle in which an automatic transmission having a coupling element that is engaged upon a start of the vehicle is installed, the vehicle being subjected to neutral control for releasing the coupling element when the vehicle is stopped with predetermined conditions satisfied while the automatic transmission is in a forward drive position. The start control device includes a detecting unit that detects a condition of application of brakes to the vehicle, and a control unit that controls an engaging state of the coupling element when the vehicle returns from the neutral control, based on the condition of application of the brakes detected by the detecting unit.

According to the third aspect of the invention, when the vehicle returns from the neutral control while the brake pressure of the vehicle is still high, the control unit reduces the initial engagement pressure of the coupling element upon return from the neutral control so that the coupling element is slowly engaged. With this arrangement, the coupling element is not abruptly engaged while the driver is pressing the braking pedal during return from the neutral control, and therefore no engagement shock occurs during return from the neutral control. Furthermore, the vehicle can be appropriately started after the neutral control. Thus, the start control device for the vehicle according to the third aspect of the invention is able to perform improved vehicle start control based on the braking condition at the time of return from the neutral control.

In one embodiment of the third aspect of the invention, the detecting unit detects a braking operation performed by a driver of the vehicle, and the control unit controls the engaging state of the coupling element during return from the neutral control, based on the braking operation detected by the detecting unit.

According to the embodiment as described just above, when the driver quickly releases the brakes upon return from the neutral control, for example, the control unit operates to rapidly engage the coupling element during return from the neutral control. With this arrangement, when the driver wishes to quickly reduce the braking force for a quick start of the vehicle, the coupling element is rapidly engaged so that the vehicle can be smoothly started without giving a feeling of tardiness when returning from the neutral control. Thus, the start control device of the vehicle is able to perform improved vehicle start control based on the condition in which the brakes are released upon return from the neutral control.

In the start control device as described just above, the control unit may control the engaging state of the coupling element during return from the neutral control, based on an operation to release the brakes upon return from the neutral control, which operation is detected by the detecting unit as the braking operation performed by the driver. In this case, when the driver's operation detected by the detecting unit is to rapidly release the brakes upon return from the neutral control, the control unit operates to quickly engage the coupling element during return from the neutral control, so that the vehicle can be smoothly started without giving a feeling of tardiness when returning from the neutral control.

In the start control device as described just above, the control unit may control the engaging state of the coupling element during return from the neutral control, based on the speed of releasing the brakes upon return from the neutral control. In this case, when the driver's operation to release the brakes is performed at a high speed upon return from the neutral control, for example, the control unit operates to quickly engage the coupling element during return from the neutral control, so that the vehicle can be smoothly started without giving a feeling of tardiness when returning from the neutral control.

In the start control device as described just above, the control unit may control the engaging state of the coupling element such that the speed of engaging the coupling element during return from the neutral control is increased as the speed of releasing the brakes upon return from the neutral control is higher. In this case, when the driver's operation to release the brakes is performed at a high speed upon return from the neutral control, the control unit operates to quickly engage the coupling element during return from the neutral control, so that the vehicle can be smoothly started without giving a feeling of tardiness when returning from the neutral control.

In the start control device as described just above, the control unit may change an initial engagement pressure of the coupling element so as to increase the speed of engaging the coupling element during return from the neutral control. In this case, the start control device is able to quickly engage the coupling element during return from the neutral control by increasing the initial engagement pressure for engaging the coupling element.

In another embodiment of the third aspect of the invention, the control unit controls the engaging state of the coupling element, based on a magnitude of a braking force applied to the vehicle when the vehicle returns from the neutral control, which magnitude is detected by the detecting unit.

According to the above embodiment of the invention, when the vehicle returns from the neutral control, the engagement pressure of the coupling element is controlled to be different between the case where the magnitude of the braking force is large enough to actually apply the brakes, and the case where the magnitude of the braking force is not large enough to actually apply the brakes. With this arrangement, shock that would occur upon return from the neutral control can be suitably avoided or suppressed and the vehicle can be started in a desirable manner, irrespective of differences in the power transmitting characteristic during control for returning from the neutral control and the torque ratio established when the coupling element is engaged.

In the start control device of the embodiment as described just above, the detecting unit may detect the magnitude of the braking force based on the vehicle speed. In this case, the magnitude of the braking force required for changing the engagement pressure of the coupling element during return from the neutral control can be determined on the basis of the vehicle speed.

In a further embodiment of the third aspect of the invention, the control unit controls the engaging state of the coupling element, based on the presence of application of the brakes upon return from the neutral control, which is detected by the detecting unit.

According to the above embodiment of the invention, when the vehicle returns from the neutral control, the presence of application of the brakes is detected or determined from, for example, the ON/OFF state of a brake switch, and the engagement pressure of the coupling element during return from the neutral control is changed depending upon the presence of application of the brakes. With this arrangement, shock that would occur upon return from the neutral control can be suitably avoided or suppressed and the vehicle can be started in a desirable manner, irrespective of differences in the power transmitting characteristic during control for returning from the neutral control and the torque ratio established when the coupling element is engaged.

In the start control device of the embodiment as described just above, the detecting unit may detect the presence of application of the brakes based on the vehicle speed. In this case, the presence of application of the brakes required for changing the engagement pressure of the coupling element during return from the neutral control can be determined on the basis of the vehicle speed.

BRIEF DESCRIPTION OF THE DRAWINGS

The foregoing and/or further objects, features and advantages of the invention will become more apparent from the following description of exemplary embodiments with reference to the accompanying drawings, in which like numerals are used to represent like elements and wherein:

FIG. 2 is an operation table of the automatic transmission shown in FIG. 1;

FIG. 10 is a timing chart showing the operations of the vehicle in which an automatic transmission having a control device of the second embodiment is installed;

DETAILED DESCRIPTION OF EXEMPLARY EMBODIMENTS

First Embodiment

Figure 1:
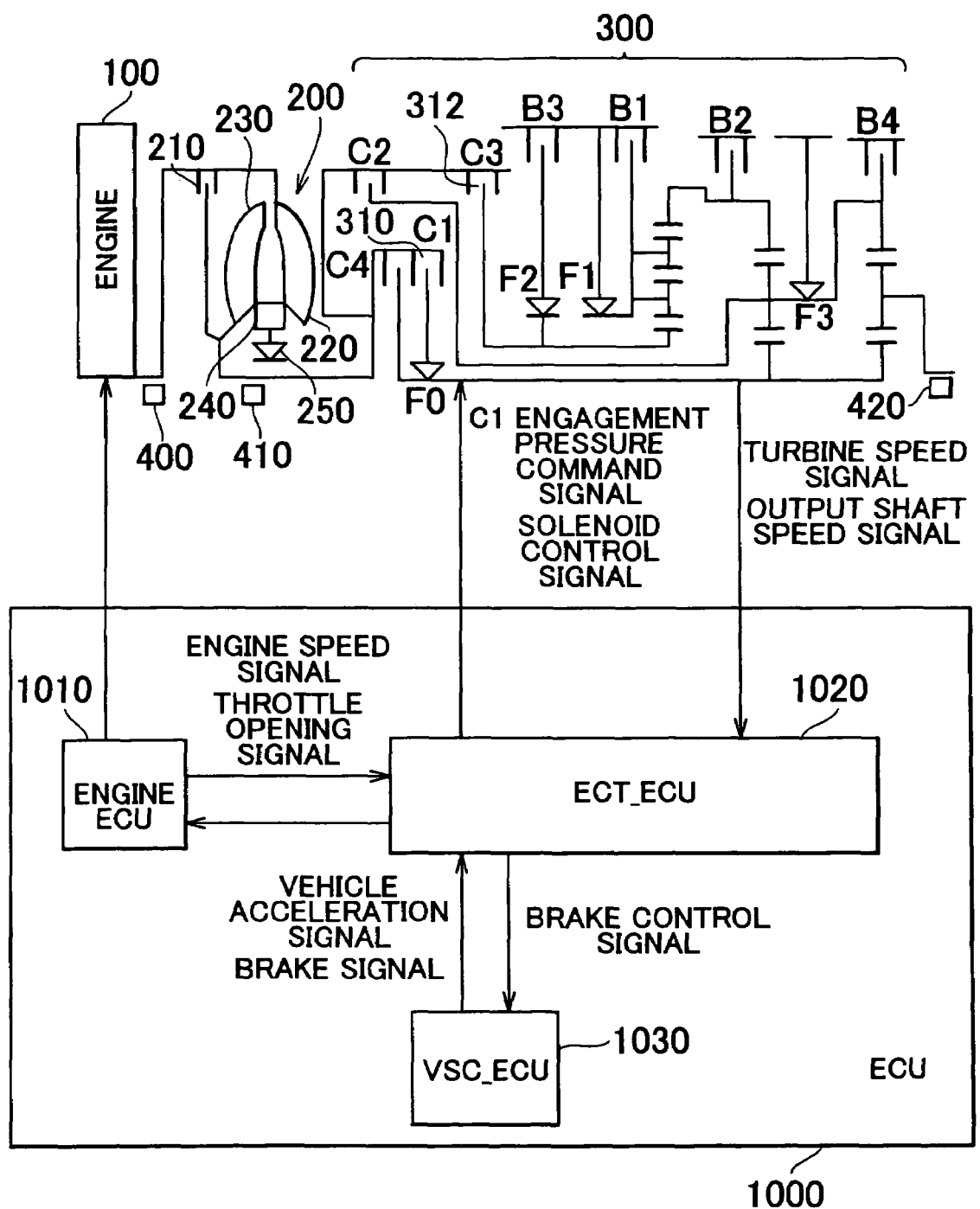
FIG. 1 is a control block diagram of an automatic transmission, showing a control device according to a first embodiment of the invention.

A power train of a vehicle including a control device according to the first embodiment of the invention will be hereinafter described. The control device of the present embodiment takes the form of an ECU (Electronic Control Unit) 1000 as shown in FIG. 1. The power train of FIG. 1 includes an automatic transmission that is provided with a torque converter as a fluid coupling and has a planetary gear type power transmitting mechanism. The invention is not limitedly applied to such automatic transmissions having planetary gear type power transmitting mechanisms, but may be equally applied to continuously variable transmissions, such as a belt-and-pulley type continuously variable transmission.

Referring to FIG. 1, the power train of the vehicle including the control device of the present embodiment will be described. More specifically, the control device of the present embodiment takes the form of an ECT (Electronic Controlled Automatic Transmission)_ECU 1020 as shown in FIG. 1.

As shown in FIG. 1, the power train principally consists of an engine 100, torque converter 200, automatic transmission 300 and the ECU 1000. In the power train, the output shaft of the engine 100 is connected to the input shaft of the torque converter 200. In other words, the engine 100 and the torque converter 200 are coupled to each other by a rotary shaft. Accordingly, the output shaft rotational speed (engine speed NE) of the engine 100 detected by an engine speed sensor 400 is equal to the input shaft rotational speed (pump speed) of the torque converter 200.

The torque converter 200 principally consists of a lock-up clutch 210 that directly couples the input shaft with the output shaft, a pump impeller 220 coupled to the input shaft, a turbine wheel 230 coupled to the output shaft, and a stator 240 that has a one-way clutch 250 and performs a torque amplifying function. The torque converter 200 and the automatic transmission 300 are connected to each other by a rotary shaft. The output shaft rotational speed NT (turbine speed NT) of the torque converter 200 is detected by a turbine speed sensor 410. The output shaft rotational speed NOUT of the automatic transmission 300 is detected by an output shaft speed sensor 420.

FIG. 2 shows an operation table of the automatic transmission 300. The operation table shown in FIG. 2 indicates which ones of clutch elements (C1–C4 in FIG. 2), brake elements (B1–B4) and one-way clutch elements (F0–F3) as friction devices are engaged and released when the automatic transmission 300 establishes each of the gear positions or stages, i.e., parking (P) position, reverse drive (R) position, neutral (N) position, and 1st-speed through 6th-speed forward drive positions. When the 1st-speed gear position used for starting of the vehicle is to be established, the clutch element C1 and the one-way clutch elements F0, F3 are engaged. Of these clutch elements, the clutch element C1 is particularly called "input clutch" 310. The input clutch 310 is also called "forward clutch", which is always in the engaged state when forward drive positions (i.e., the 1st-speed through 6th-speed positions) for running the vehicle forward, other than the parking (P) position, reverse drive (R) position and the neutral (N) position, are established.

When a shift lever 2044 as described later is placed in the forward drive (D) position, and the vehicle is determined to be in a stopped state with predetermining conditions (for example, (a) the accelerator pedal is released, AND (b) the brake pedal is depressed, AND (c) the brake master cylinder pressure is equal to or greater than a predetermined value, AND (d) the vehicle speed is equal to or lower than a predetermined value) satisfied, the input clutch 310 is released and is brought into a certain slipping state, which is close to a neutral state. This control is called "neutral control".

The ECU 1000 for controlling the power train includes an engine ECU 1010 for controlling the engine 100, ECT (Electronic Controlled Automatic Transmission)_ECU 1020 for controlling the automatic transmission 300, and VSC (Vehicle Stability Control)_ECU 1030.

The ECT_ECU 1020 receives a signal indicative of the turbine speed NT from the turbine speed sensor 410 and a signal indicative of the output shaft rotational speed NOUT from the output shaft speed sensor 420. The ECT_ECU 1020 also receives, from the engine ECU 1010, a signal indicative of the engine speed NE detected by the engine speed sensor 400 and a signal indicative of the throttle opening detected by a throttle position sensor.

The engine speed sensor 400, turbine speed sensor 410 and the output shaft speed sensor 420 are positioned so as to face the teeth of rotation sensing gears mounted on the input shaft of the torque converter 200, the output shaft of the torque converter 200 and the output shaft of the automatic transmission 300. These speed sensors are capable of detecting even slight rotation of the input shaft of the torque converter 200, the output shaft of the torque converter 200 and the output shaft of the automatic transmission 300, respectively, and may be in the form of sensors using magneto-resistive devices, which are generally called "semiconductor type sensors".

The ECT_ECU 1020 also receives, from the VSC_ECU 1030, a signal indicative of the vehicle acceleration detected by a G sensor and a signal indicative of the ON state of the brakes. The VSC_ECU 1030 receives a brake control signal from the ECT_ECU 1020, and controls the brakes of the vehicle by controlling a hydraulic circuit as described later.

Figure 3:
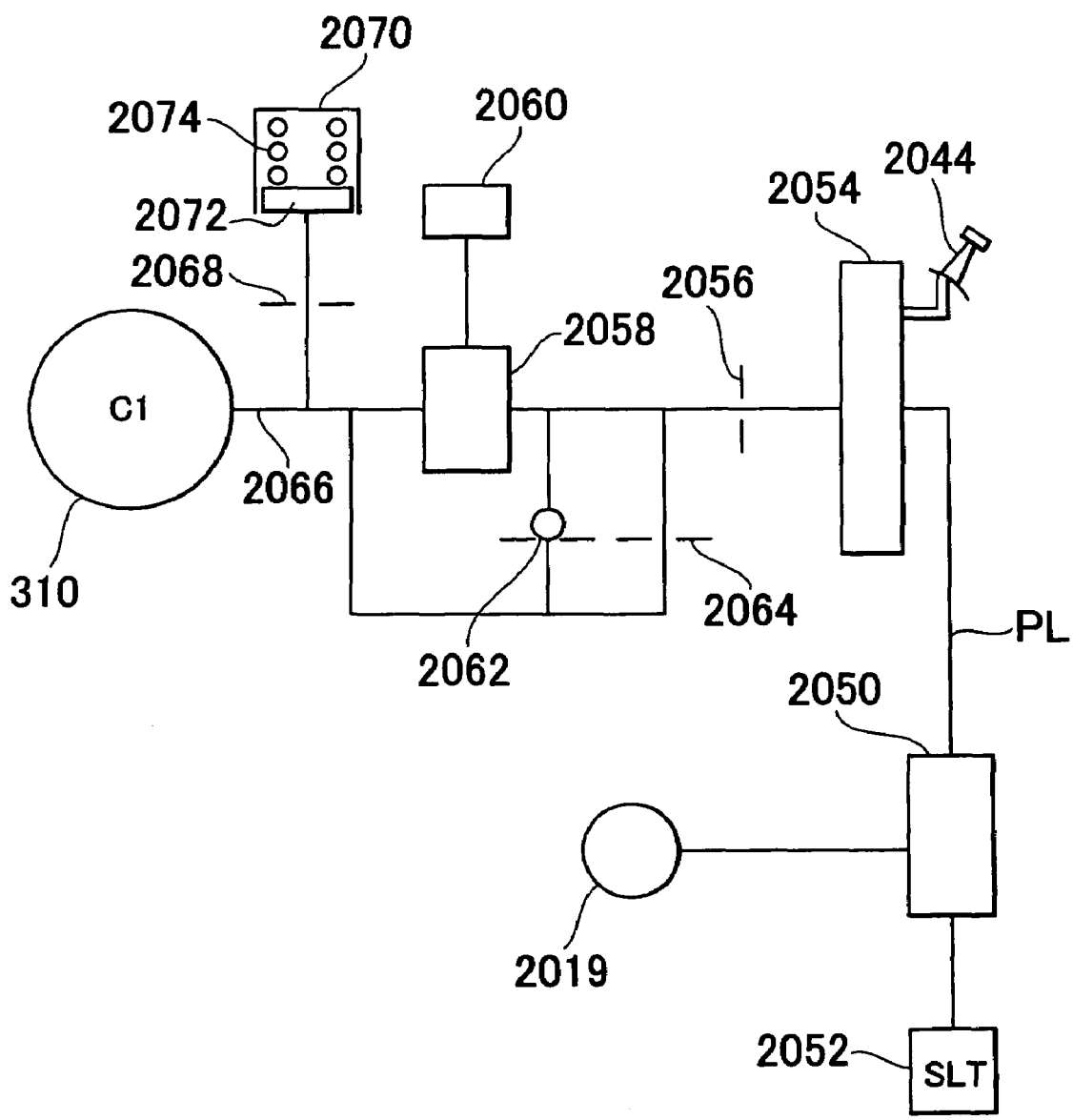
FIG. 3 is a view showing a hydraulic circuit of the automatic transmission.

Referring to FIG. 3, a hydraulic circuit for engaging the input clutch (C1) 310 in a hydraulic control system of the automatic transmission 300 will be described.

A primary regulator valve 2050 is controlled by a line pressure control solenoid 2052, and regulates the original pressure generated by an oil pump 2019 into a line pressure PL. The line pressure PL is fed to a manual valve 2054. The manual valve 2054, which is mechanically connected to the shift lever 2044, communicates the line pressure PL with an oil channel leading to the input clutch (C1) 310 when the shift lever 2044 is placed in a forward drive position, such as the forward drive (D) position or the manual 1st-speed or 2nd-speed position.

A large orifice 2056 and a switching valve 2058 are interposed between the manual valve 2054 and the input clutch (C1) 310. The switching valve 2058 is controlled by a solenoid 2060, and is selectively placed in a first position in which the valve 2058 allows the oil that has passed the large orifice 2056 to be fed to the input clutch (C1) and a second position in which the valve 2058 shuts off the oil communication.

A check ball 2062 and a small orifice 2064 are arranged in parallel with each other so as to bypass the switching valve 2058. When the switching valve 2058 is placed in the second or shut-off position by the solenoid 2060, the oil that has passed the large orifice 2056 reaches the input clutch (C1) 310 via the small orifice 2064. The check ball 2062 functions to facilitate release of the hydraulic pressure of the input clutch (C1) 310.

An accumulator 2070 is connected, via an orifice 2068, to an oil channel 2066 between the switching valve 2058 and the input clutch (C1) 310. The accumulator 2070 includes a piston 2072 and a spring 2074. When the oil is supplied to the input clutch (C1) 310, the accumulator 2070 functions to keep the hydraulic pressure in the input clutch (C1) 310 at a certain pressure determined by the spring 2074 for a while so as to reduce shock that would occur upon engagement of the input clutch (C1) 310.

Figure 4:
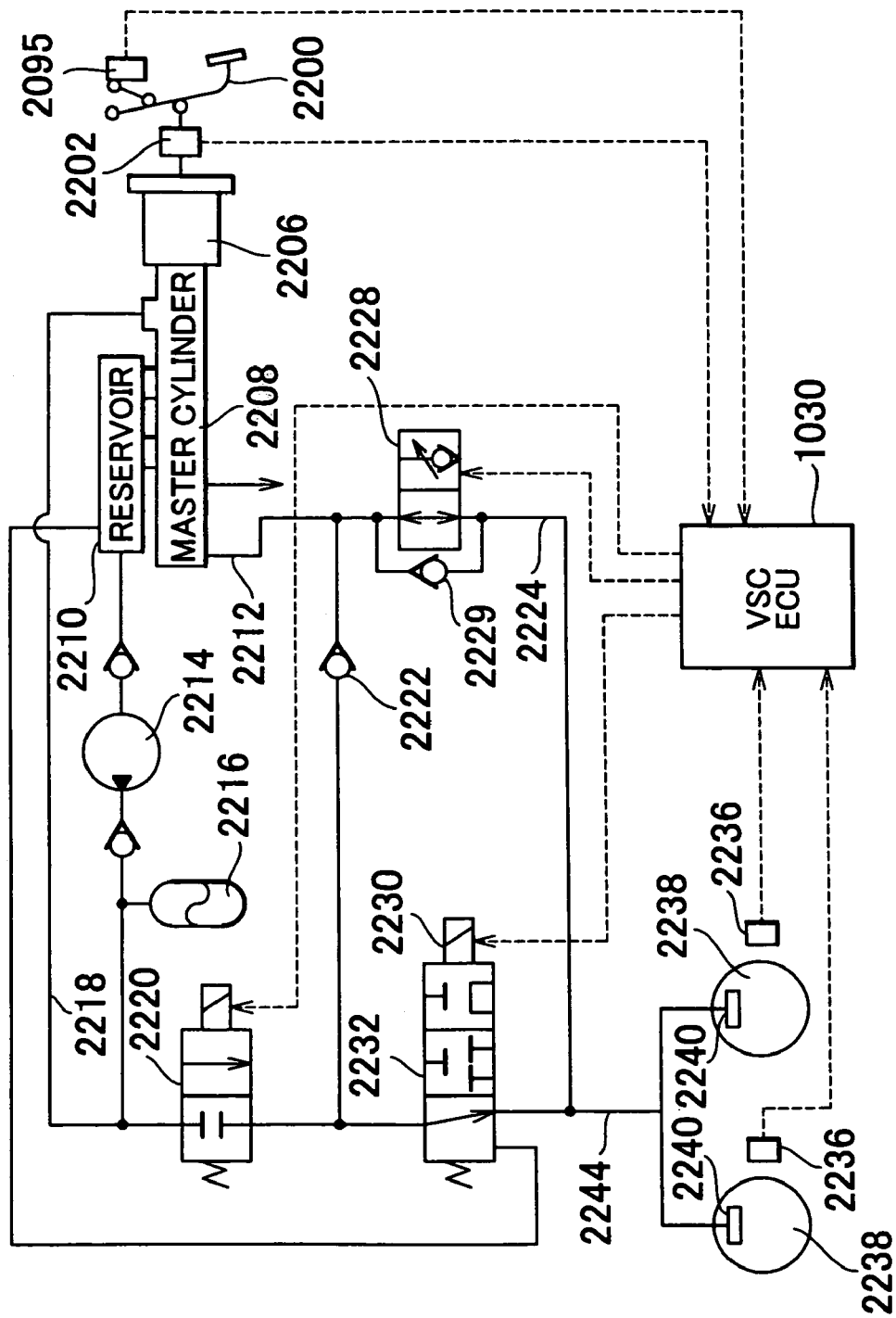
FIG. 4 is a view showing a hydraulic circuit of vehicle brakes.

Referring next to FIG. 4, the structure of a brake system for keeping the vehicle stopped will be described.

In FIG. 4, a brake pedal 2200 is a brake operating member that is operated by the driver of the vehicle. The brake pedal 2200 actuates a master cylinder 2208 via a hydraulic booster 2206. A reservoir 2210 is mounted on top of the master cylinder 2208, and a pump 2214 is used for pumping up brake fluid from the reservoir 2210 so that the brake fluid is stored under a high pressure in an accumulator 2216. To the accumulator 2216 is connected the booster 2206 through a fluid passage 2218.

A pressure chamber (not shown) within the master cylinder 2208 is connected to wheel cylinders 2240 of brakes for front wheels 2238. While another pressure chamber (not shown) is connected to wheel cylinders of brakes for rear wheels, the construction of the rear wheel system, which is substantially identical with that of the front wheel system, will not be illustrated nor described, but only the front wheel system will be described herein.

A check valve 2222 and a solenoid-operated pressure regulating valve 2232 that is actuated by a solenoid 2230 are disposed in the fluid passage 2212. The solenoid-operated pressure regulating valve 2232 is normally placed in a pressure increasing position in which the fluid passages 2212 and 2244, or the master cylinder 2208 and the wheel cylinders 2240, communicate with each other so as to permit pressure increases in the wheel cylinders 2240. When middle current is supplied to the solenoid 2230, the pressure regulating valve 2232 is switched to a pressure keeping position in which the communication between the master cylinder 2208 and the wheel cylinders 2240 is cut off. When large current is supplied to the solenoid 2230, the pressure regulating valve 2232 is switched to a pressure reducing position in which the wheel cylinders 2240 and the reservoir 2210 communicate with each other so as to permit pressure reductions in the wheel cylinders 2240. Thus, the solenoid-operated pressure regulating valve 2232 is a three-position solenoid valve.

A bypass passage 2224 that bypasses the solenoid-operated pressure regulating valve 2232 is provided between the master cylinder 2208 and the wheel cylinders 2240. The brake fluid in the wheel cylinders 2240 is returned to the master cylinder 2208 via the bypass passage 2224.

A linear valve 2228 having the function of keeping the brake fluid in the wheel cylinders 2240 when the brakes are applied is provided in the bypass passage 2224 between the master cylinder 2208 and the wheel cylinders 2240. The linear valve 2228 is not limited to simple two-way, i.e., ON/OFF control, but has the function of linearly changing the valve position so that the valve can be controlled to a desired position.

As described later, the linear valve 2228 makes it possible to perform control for slowly releasing the brake pressure, for example, when the brake pedal 2200 is rapidly released. In the present embodiment, the timing of reduction of the braking force and the magnitude of the braking force are controlled through control of the linear valve 2228.

A pressurizing valve 2229 capable of apply pressure to the wheel cylinders 2240 is disposed in the bypass passage 2224 so as to bypass the linear solenoid 2228. The pressurizing valve 2229 serves to prevent reduction of the braking force due to reduction of the brake pressure when the brake pressure is to be kept at a certain level.

The accumulator 2216 is connected to a portion of the fluid passage 2212 downstream of the check valve 2222, via a solenoid open/close valve 2220. The solenoid open/close valve 2220 is normally in a closed position to cut off communication between the accumulator 2216 and the fluid passage 2212, but is placed in an open position upon a start of the operation of the solenoid-operated pressure regulating valve 2232 so that high-pressure brake fluid is supplied from the accumulator 2216 to the solenoid-operated pressure regulating valve 2232. The high-pressure brake fluid supplied from the accumulator 2216 is prevented from flowing into the master cylinder 2208 by a check valve 2222 provided in the fluid passage 2212.

Rotational speed sensors 2236 detect the speeds of rotation of the front wheels 2238, and a brake switch 2095 detects depression of the brake pedal 2200, while a load cell 2202 detects the force applied to the brake pedal 2200. The VSC_ECU 1030 generates control signals to the solenoid-operated pressure regulating valve 2232, linear valve 2228 and the solenoid open/close valve 2220, based on signals from the above sensors and switch, a brake control signal from the ECT_ECU 1020 and so forth, and controls the hydraulic pressures of the wheel cylinders 2240, namely, the braking forces applied to the wheels.

Figure 5:
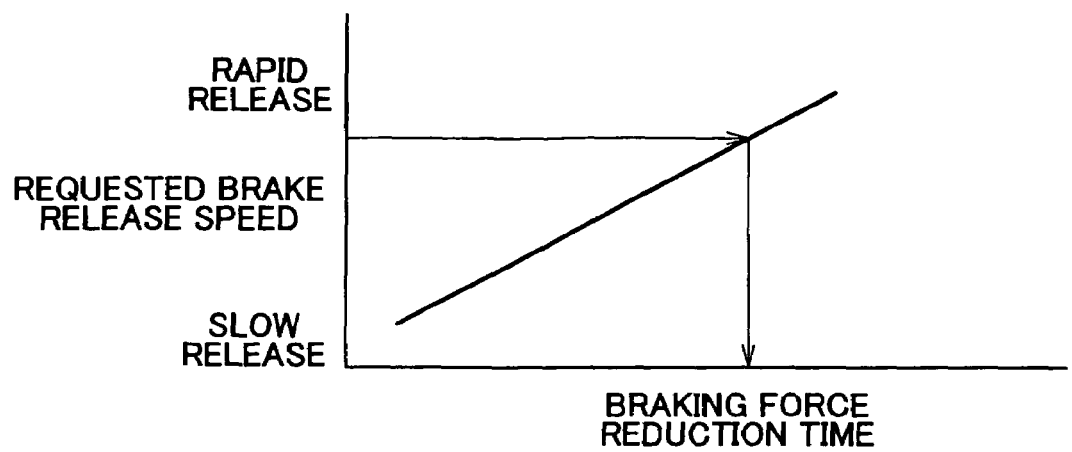
FIG. 5 is a graph showing the relationship between the requested speed of releasing the brakes and the braking force reduction time.

FIG. 5 indicates the relationship between the period of time for which the braking force is reduced and the requested speed of releasing the brakes, which relationship is stored in a memory of the ECT_ECU 1020.

As shown in FIG. 5, the time of reduction of the braking force is set to be increased as the speed of releasing the brakes requested by the driver increases. Namely, when the brake pedal 2200 is rapidly released by the driver, the braking force is slowly reduced, thereby to avoid or reduce engagement shock upon engagement of the input clutch (C1) 310 and abnormal noise from the vehicle brakes. When the brake pedal 2200 is slowly or gently released by the driver, on the other hand, the actual time of reduction of the braking force is not extended so that the vehicle can be smoothly started without giving a feeling of tardiness.

It is to be understood that the relationship between the requested speed of releasing the brakes and the braking force reduction time as shown in FIG. 5 is a mere example, and that the relationship between these parameters is not limited to that of FIG. 5. For example, the braking force reduction time may be increased by a certain period of time if the requested brake release speed is greater than a predetermined value (i.e., the brake pedal 2200 is released at a higher speed than a predetermined release speed).

The control of the braking force reduction time involves increasing the period of time for which the braking force is reduced. The braking force reduction time may be increased in various manners, for example, by slowly and constantly reducing the braking force at a certain slope, or keeping the braking force at a certain level in the middle of the control and then slowly reducing the braking force.

Figure 6:
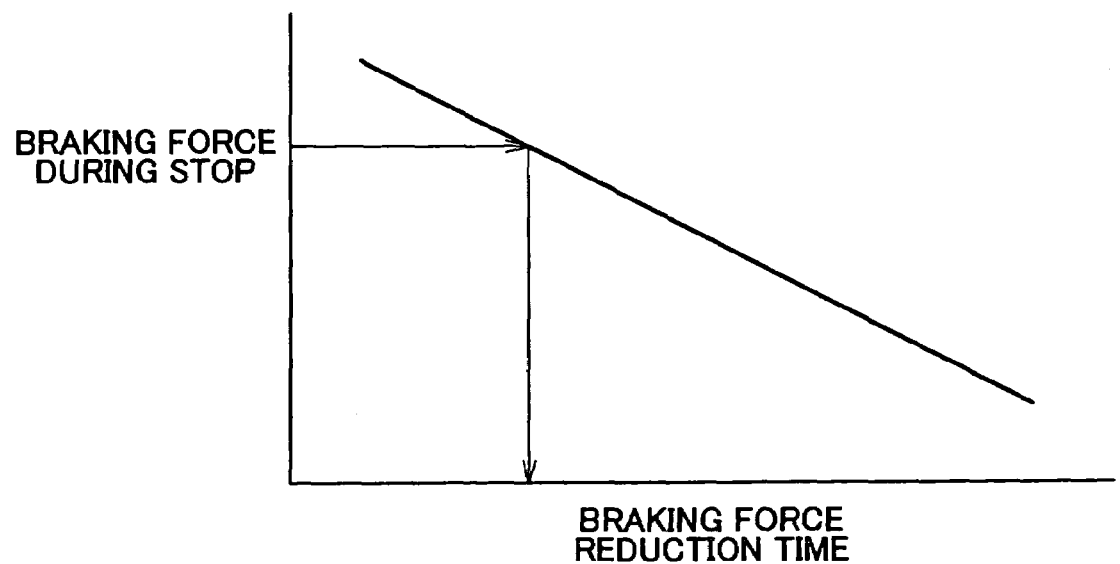
FIG. 6 is a graph showing the relationship between the braking force during neutral control and the braking force reduction time.

FIG. 6 shows the relationship between the braking force established when the vehicle is stopped under neutral control and the braking force reduction time, which relationship is stored in a memory of the ECT_ECU 1020.

As shown in FIG. 6, the braking force reduction time is set to be reduced as the braking force during a stop of the vehicle under neutral control is larger, and is set to be increased as the braking force during a stop of the vehicle under neutral control is smaller. By increasing the braking force reduction time (namely, by delaying reduction of the braking force) as the braking force during a stop of the vehicle under neutral control is smaller, the vehicle braking force is prevented from being quickly changed (i.e., reduced) to zero, and engagement shock upon engagement of the input clutch (C1) 310 and abnormal noise from the vehicle brakes can be avoided or suppressed. Also, where the braking force during a stop of the vehicle under neutral control is large, the braking force is rapidly reduced so that the vehicle can be quickly started without giving a feeling of tardiness.

It is to be understood that the relationship between the braking force during a stop of the vehicle under neutral control and the braking force reduction time as shown in FIG. 6 is a mere example, and that the relationship between these parameters is not limited to that of FIG. 6.

Figure 7:
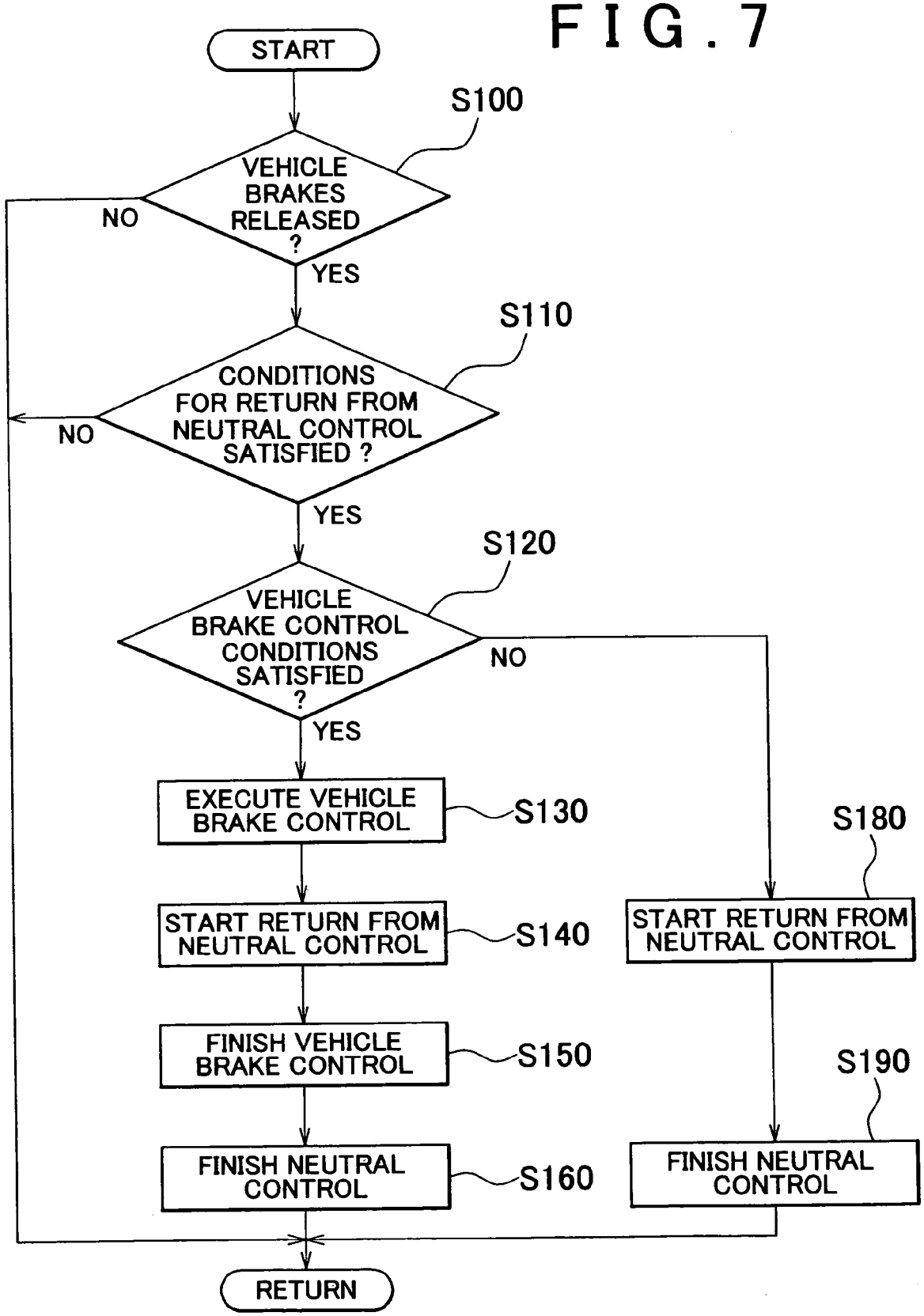
FIG. 7 is a flowchart showing the control scheme of a program executed by ECU according to the first embodiment of the invention.

Referring next to FIG. 7, the control scheme of a program executed by the ECT_ECU 1020 as the control device of the present embodiment will be described.

In step S100, the ECT_ECU 1020 determines whether release of the vehicle brakes is detected. This determination is made based on a brake signal transmitted from the VSC_ECU 1030 to the ECT_ECU 1020. If release of the vehicle brakes is detected (i.e., if "YES" is obtained in step S100), the control process proceeds to step S110. If not (i.e., if "NO" is obtained in step S100), this process is finished.

In step S110, the ECT_ECU 1020 determines whether conditions for returning from neutral control are satisfied. This determination is made based on various signals received by the ECT_ECU 1020. If the conditions for returning from neutral control are satisfied (i.e., if "YES" is obtained in step S110), the control process proceeds to step S120. If not (i.e., if "NO" is obtained in step S110), this process is finished.

In step S120, the ECT_ECU 1020 determines whether vehicle brake control conditions are satisfied. This determination is made depending upon whether the requested brake release speed and the braking force during neutral control as shown in FIG. 5 and FIG. 6 are within suitable ranges for which the vehicle brake control is executed. If the vehicle brake control conditions are satisfied (i.e., if "YES" is obtained in step S120), the control process proceeds to step S130. If not (i.e., if "NO" is obtained in step S120), the control process proceeds to step S180.

In step S130, the ECT_ECU 1020 executes vehicle brake control. In this step, the manner of releasing the vehicle brakes is controlled based on the relationship between the requested speed of releasing the brakes and the braking force reduction time as shown in FIG. 5 or the relationship between the braking force during neutral control and the braking force reduction time as shown in FIG. 6.

More specifically, a brake control signal is transmitted from the ECT_ECU 1020 to the VSC_ECU 1030, and the VSC_ECU 1030 executes control of reducing the braking force of the vehicle so as to provide the braking force reduction time as shown in FIG. 5 or FIG. 6, by using the hydraulic circuit as shown in FIG. 4.

In step S140, the ECT_ECU 1020 starts the process of returning from neutral control. In step S150, the vehicle brake control is finished. In step S160, the ECT_ECU 1020 finishes the neutral control.

In step S180, the ECT_ECU 1020 starts the process of returning from neutral control. The process of step S180 is the same as the process of step S140 as described above. In step S190, the ECT_ECU 1020 finishes execution of the neutral control. The process of step S190 is the same as the process of step S160 as described above.

The operations of the vehicle in which the ECT_ECU 1020 as the control device of the present embodiment is installed, which operations are based on the flowchart of FIG. 7 as described above, will be described with reference to the timing charts shown in FIG. 8A through FIG. 8F.

Figure 8A:
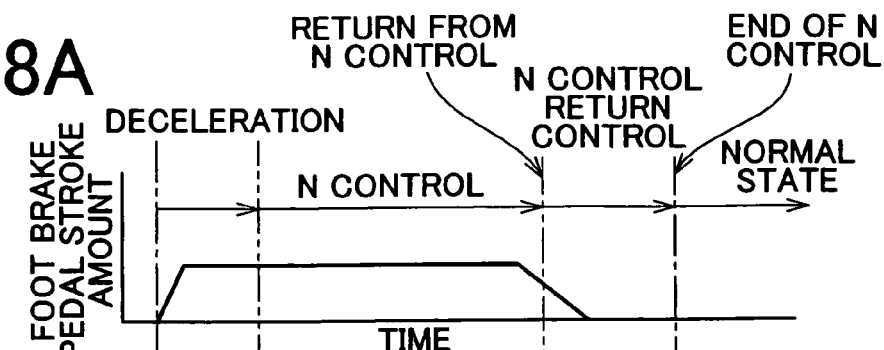
FIG. 8 is a timing chart showing the operations of the vehicle in which the automatic transmission having the control device of the first embodiment is installed.
Figure 8B:
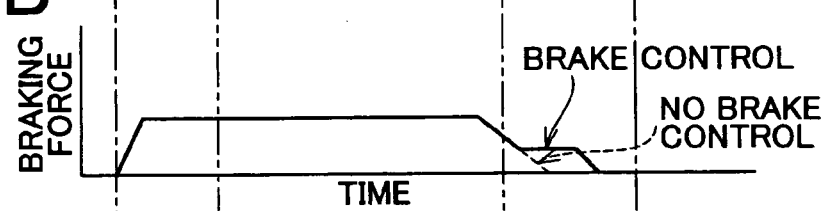
Figure 8C:
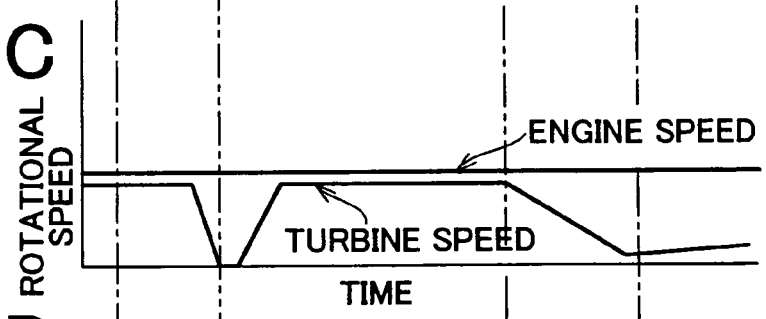
Figure 8D:
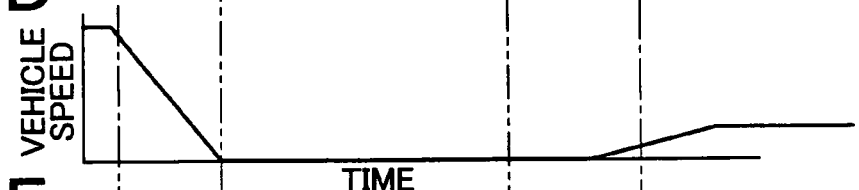
Figure 8E:
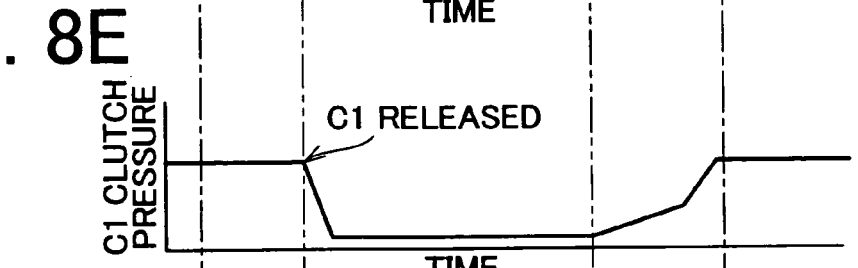
Figure 8F:
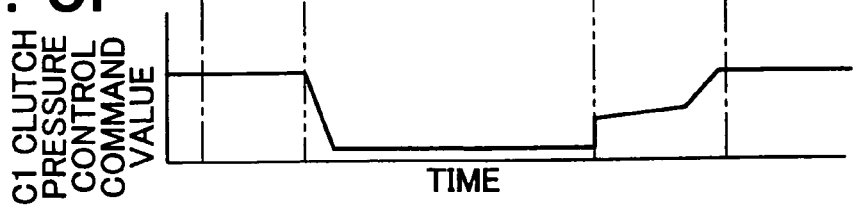

As shown in FIG. 8A, when the vehicle is decelerated and enters neutral control, the control command value of the clutch pressure of the input clutch (C1) 310 is changed as shown in FIG. 8F, and the clutch pressure of the input clutch (C1) 310 is reduced as shown in FIG. 8E, so that the input clutch (C1) 310 is released. As a result, the engine speed NE and the turbine speed NT are changed as shown in FIG. 8C. During the neutral control, the vehicle speed is equal to zero as shown in FIG. 8D.

In this condition, if the conditions for returning from neutral control are satisfied (i.e., if "YES" is obtained in step S110), it is determined (in step S120) whether the vehicle brake control conditions are satisfied. If it is determined that the vehicle brake control needs to be performed based on the requested brake release speed (i.e., the speed at which the brake pedal is released by the driver) upon return from the neutral control or the braking force during the neutral control (i.e., if "YES" is obtained in step S120), the vehicle brake control is carried out (in step S130).

If the vehicle brake control is not performed, the vehicle braking force is uniformly reduced when the vehicle returns from neutral control, as shown in FIG. 8B. If the vehicle brake control is performed, on the other hand, the vehicle brake reduction time, namely, the period of time for which the braking force is reduced, is increased or extended. When the vehicle returns from neutral control, the control command value of the clutch pressure of the input clutch (C1) 310 is increased as shown in FIG. 8F, and the clutch pressure of the input clutch (C1) 310 is increased with a delay due to a response delay of the hydraulic circuit, as shown in FIG. 8E. Even in this case, the period of time for which the vehicle braking force is reduced is extended as shown in FIG. 8B, and therefore the vehicle is prevented from rolling or moving backward.

To perform the above control, the braking force during neutral control may be determined based on the stroke amount of the brake pedal 2200 during neutral control as shown in FIG. 8A, and the braking force reduction time may be calculated from the map as shown in FIG. 6, based on the braking force thus determined. Alternatively, the speed of reduction of the stroke amount of the brake pedal 2200 (i.e., the requested brake release speed) at the time of return from neutral control as shown in FIG. 8A may be determined, and the braking force reduction time may be calculated from the map as shown in FIG. 5, based on the requested brake release speed thus determined.

In the example of FIG. 8A through 8F, when the brake control is performed, the braking force is reduced as shown in FIG. 8B such that the braking force is temporarily kept at the same level for a certain period of time. However, the braking force is not necessarily reduced in this manner. For example, the braking force may be uniformly reduced at a smaller rate than that in the case where no brake control is performed.

As described above, the control device according to the present embodiment controls the braking force in accordance with the braking force during neutral control, or the speed at which the foot brake pedal is released or returned to the original position by the driver upon return from neutral control. Namely, the braking force reduction time is increased when the requested brake release speed is high (i.e., the brake pedal is rapidly released), and the braking force reduction time is reduced when the requested brake release speed is low (i.e., the brake pedal is slowly released). Also, the braking force reduction time is reduced as the braking force during neutral control is larger, and is increased as the braking force during neutral control is smaller.

With the vehicle braking force reduced in the above manner, engagement shock that would occur upon engagement of the input clutch (C1) and abnormal noise from the brakes are prevented or suppressed, and the vehicle can be smoothly started without giving a feeling of tardiness. Thus, the brakes are controlled based on the braking operation of the driver of the vehicle for which neutral control is performed, so that the vehicle can favorably return from the neutral control.

Second Embodiment

The second embodiment of the invention will be hereinafter described. In the second embodiment, a program different from that of the first embodiment is executed. The hardware construction of the control device of the second embodiment is the same as that of the first embodiment, and thus will not be described herein.

Figure 9:
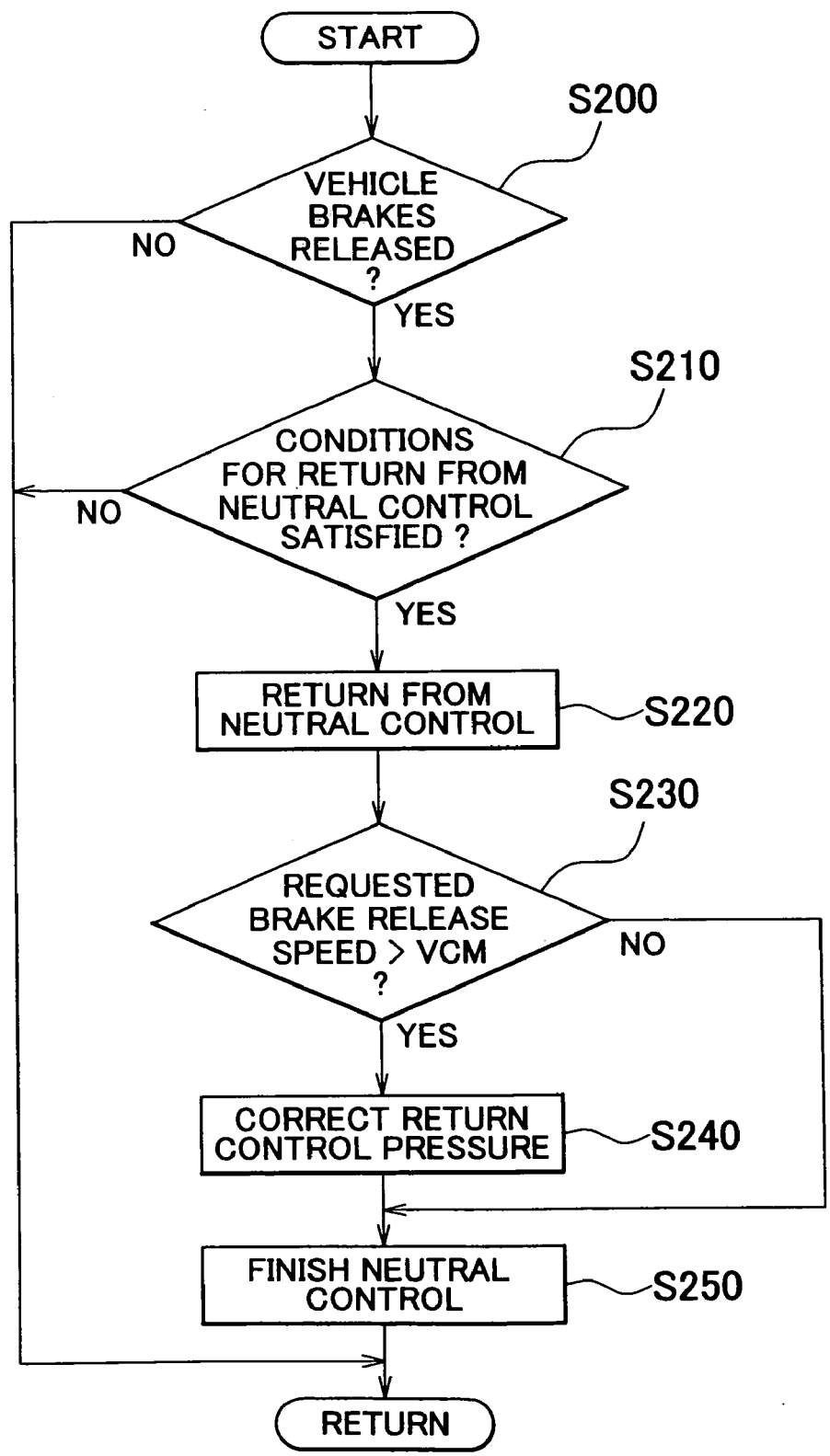
FIG. 9 is a flowchart showing the control scheme of a program executed by ECU according to a second embodiment of the invention.

Referring to FIG. 9, the control scheme of the program executed by the ECT_ECU 1020 according to the present embodiment will be described.

The ECT_ECU 1020 as the control device of the present embodiment is characterized by correcting a return control pressure of the input clutch (C1) 310 when the requested speed of releasing the vehicle brakes is larger than a predetermined threshold value VCM.

In step S200, the ECT_ECU 1020 determines whether release of the vehicle brakes is detected. If release of the vehicle brakes is detected (i.e., if "YES" is obtained in step S200), the control process proceeds to step S210. If not (i.e., if "NO" is obtained in step S200), the control process is finished.

In step S210, the ECT_ECU 1020 determines whether conditions for returning from neutral control are satisfied. If the conditions for returning from neutral control are satisfied (i.e., if "YES" is obtained in step S210), the control process proceeds to step S220. If not (i.e., if "NO" is obtained in step S210), the control process is finished.

In step S220, the ECT_ECU 1020 executes the process of returning from neutral control. In step S230, the ECT_ECU 1020 determines whether the requested speed of releasing the vehicle brakes is larger than the predetermined threshold value VCM. If the requested brake release speed is larger than the predetermined threshold value VCM (i.e., if "YES" is obtained in step S230), the control process proceeds to step S240. If not (i.e., if "NO" is obtained in step S230), the control process proceeds to step S250.

In step S240, the ECT_ECU 1020 corrects the control pressure of the input clutch (C1) 310 to be established when the vehicle returns from neutral control. In step S250, the ECT_ECU 1020 finishes the process of returning from the neutral control, and thus finishes the neutral control.

The operations of the vehicle in which the ECT_ECU 1020 as the control device of the present embodiment is installed, which operations are based on the flowchart of FIG. 9 as described above, will be described with reference to the timing charts shown in FIG. 10A through FIG. 10F. It is to be understood that the same operations as those of the first embodiment will not be described herein.

In each of the case where the brake pedal 2200 is rapidly released (as indicated by the solid line in FIG. 10A) by the driver upon return from neutral control and the case where the brake pedal 2200 is gently or slowly released (as indicated by the broken line in FIG. 10A), the control pressure of the input clutch (C1) 310 is controlled in a corresponding manner as shown in FIG. 10E and FIG. 10F. When release of the vehicle brakes is detected (i.e., "YES" is obtained in step S200), and the conditions for returning from neutral control are satisfied (i.e., "YES" is obtained in step S210), the process of returning from neutral control is carried out (in step S220). At this time, the driver releases or returns the foot brake pedal 2200, as shown in FIG. 10A.

If the requested speed of releasing the vehicle brakes is larger than the predetermined threshold value VCM (i.e., if "YES" is obtained in step S230), the return control pressure of the input clutch (C1) 310 is corrected as indicated in FIG. 10E. In this connection, the requested speed of releasing the vehicle brakes is larger than the predetermined threshold value VCM in the case where the driver rapidly releases the foot brake pedal 2200 as indicated by the solid line in FIG. 10A when the vehicle returns from neutral control. In this case, the vehicle braking force is rapidly reduced as shown in FIG. 10B in accordance with the stroke amount of the brake pedal 2200 as shown in FIG. 10A. In this case, the control pressure of the input clutch (C1) 310 upon return from neutral control is corrected.

In the above case, the ECT_ECU 1020 generates a control command value of the clutch pressure of the input clutch (C1) 310 so as to increase the initial engagement pressure (i.e., the engagement pressure in the initial period of engagement of the clutch (C1) 310), as shown in FIG. 10F. In other words, the ECT_ECU 1020 generates an engagement pressure command signal to the input clutch (C1) 310 of the automatic transmission 300 so as to increase the initial engagement pressure that is determined by the control command value of the input clutch (C1) 310 as shown in FIG. 10F. Thus, when the brake pedal 2200 is rapidly released, the clutch pressure of the input clutch (C1) 310 is rapidly increased as shown in FIG. 10E, as compared with the case where the brake pedal 2200 is gently or slowly released.

With the above arrangement, even where the brake pedal is rapidly released, and the braking force of the vehicle is rapidly reduced as shown in FIG. 10B, the pressure of the input clutch (C1) 310 can be rapidly increased as shown in FIG. 10E, so that the vehicle is prevented from rolling or moving backward.

As described above, when the requested speed of releasing the vehicle brakes upon return from neutral control is large, the ECT_ECU 1020 as the control device of the present embodiment corrects the control pressure of the input clutch so as to increase the initial engagement pressure and increase the speed of engagement of the input clutch. Thus, when the driver of the vehicle wishes to quickly start the vehicle upon return from neutral control, the driver can quickly release the brake pedal so that the input clutch is rapidly engaged, thereby to quickly or smoothly start the vehicle.

Third Embodiment

The third embodiment of the invention will be hereinafter described. In the third embodiment, a program different from those of the first and second embodiments is executed. The hardware construction of the control device of the third embodiment is the same as that of the first embodiment, and will not be described herein.

Figure 11:
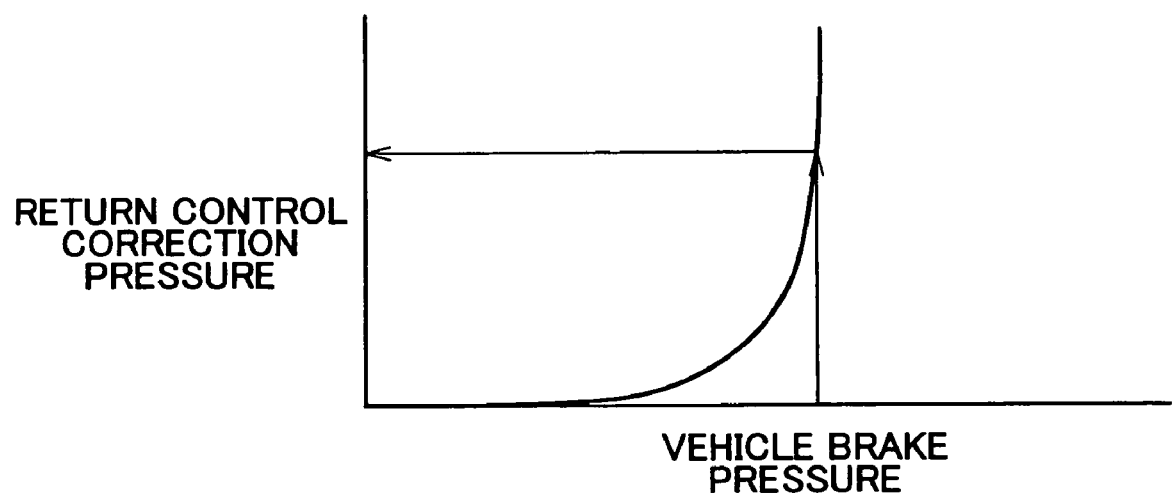
FIG. 11 is a graph showing the relationship between the vehicle brake pressure and the return control correction pressure.

FIG. 11 shows the relationship between the vehicle brake pressure and the return control correction pressure as described later, which relationship is stored in a memory of the ECT_ECU 1020.

As shown in FIG. 11, the return control correction pressure is set to be larger as the brake pressure of the vehicle is higher. Here, the initial pressure (C1 return initial pressure) of the input clutch (C1) 310 established in the initial period of return from neutral control is obtained by subtracting the return control correction pressure from the initial pressure (C1 normal return initial pressure) of the input clutch (C1) 310 to be established in the initial period of return from neutral control in a normal state (in which the brakes are not applied). In this manner, the initial pressure of the input clutch (C1) 310 can be calculated even in the case where the vehicle returns from neutral control while the brakes are still applied. As the brake pressure of the vehicle is higher, the return control correction pressure is increased so that the initial pressure (C1 return initial pressure) of the input clutch (C1) 310 is reduced. In other words, the engagement initial pressure of the input clutch (C1) at the time of return from neutral control is reduced as the brake pressure of the vehicle is higher. Thus, the engagement initial pressure of the input clutch (C1) 310 upon return from neutral control varies depending upon the brake pressure of the vehicle, thus assuring reduced shock during return from neutral control and improved starting performance of the vehicle.

Figure 12:
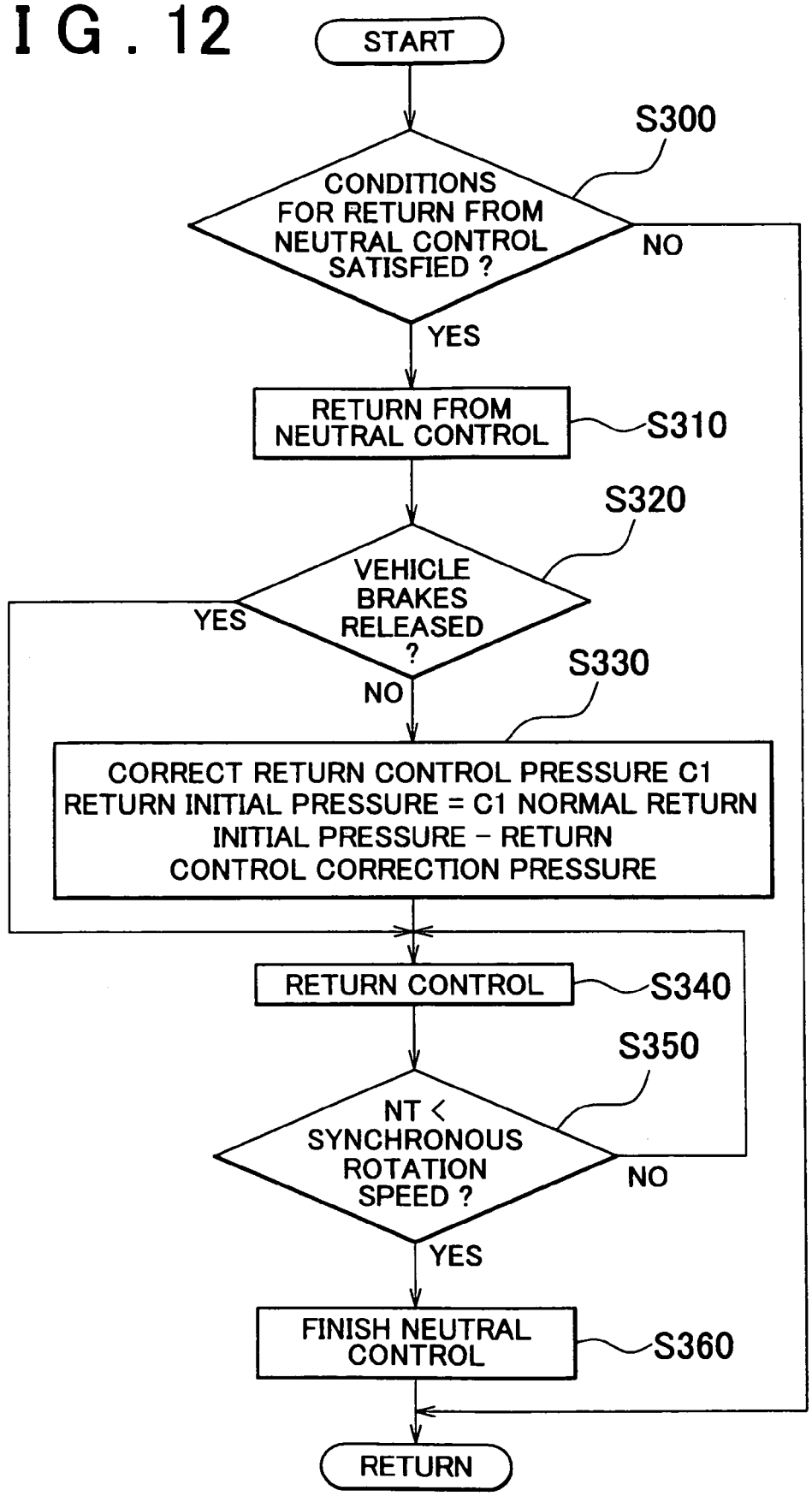
FIG. 12 is a flowchart showing the control scheme of a program executed by ECU according to a third embodiment of the invention.

Referring to FIG. 12, the control scheme of the program executed by the ECT_ECU 1020 according to the present embodiment will be described.

The ECT_ECU 1020 as the control device of the present embodiment is characterized by correcting the return initial pressure of the input clutch (C1) 310 at the time of return from neutral control, depending upon the brake pressure of the vehicle.

In step S300, the ECT_ECU 1020 determines whether conditions for returning from neutral control are satisfied. If the conditions for returning from neutral control are satisfied (i.e., if "YES" is obtained in step S300), the control process proceeds to step S310. If not (i.e., if "NO" is obtained in step S300), the control process is finished. In step S310, the ECT_ECU 1020 executes the process of returning from neutral control.

In step S320, the ECT_ECU 1020 determines whether release of the vehicle brakes is detected. If release of the vehicle brakes is detected (i.e., if "YES" is obtained in step S320), the control process proceeds to step S340. If not (i.e., if "NO" is obtained in step S320), the control process proceeds to step S330.

In step S330, the ECT_ECU 1020 corrects the return control pressure of the input clutch (C1) to be established upon return from neutral control. In this step, the return control correction pressure is determined based on the map shown in FIG. 11 and the brake pressure of the vehicle, and the return control pressure of the input clutch (C1) 310 is corrected, namely, the return initial pressure of the input clutch (C1) 310 (C1 return initial pressure) is determined, by subtracting the return control correction pressure from the C1 normal return initial pressure, i.e., the initial pressure of the input clutch (C1) 310 to be established upon return from neutral control in a normal state in which the brakes are not applied or the brake pedal is released.

In step S340, the ECT_ECU 1020 executes the process of returning from neutral control. In this step, the ECT_ECU 1020 controls the engagement pressure of the input clutch (C1) 310 by using the return initial pressure (C1 return initial pressure) obtained through correction in step S330. It is to be noted that the return initial pressure (C1 return initial pressure) thus obtained through correction is used only when release of the vehicle brakes is not detected, and that the engagement pressure of the input clutch (C1) 310 is controlled by using the C1 normal return initial pressure when release of the vehicle brakes is detected.

In step S350, the ECT_ECU 1020 determines whether the turbine speed NT becomes lower than the synchronous rotation speed (=turbine speed NT–output shaft speed NOUT×gear ratio). If the turbine speed NT becomes lower than the synchronous rotation speed (i.e., if "YES" is obtained in step S350), the control process proceeds to step S360. If not (i.e., if "NO" is obtained in step S350), the control process returns to step S340, and the process of returning from neutral control continues to be carried out.

In step S360, the ECT_ECU 1020 finishes execution of the neutral control.

In step S350, the speed ratio or the synchronous rotation speed (=turbine speed NT–output shaft speed NOUT×gear ratio) may be used instead of the turbine speed NT.

The operations of the vehicle in which the ECT_ECU 1020 as the control device of the present embodiment is installed, which operations are based on the flowchart of FIG. 12 as described above, will be described with reference to the timing charts shown in FIG. 13A through FIG. 13G. It is to be understood that the same operations as those of the first and second embodiments will not be described herein.

Figure 13A:
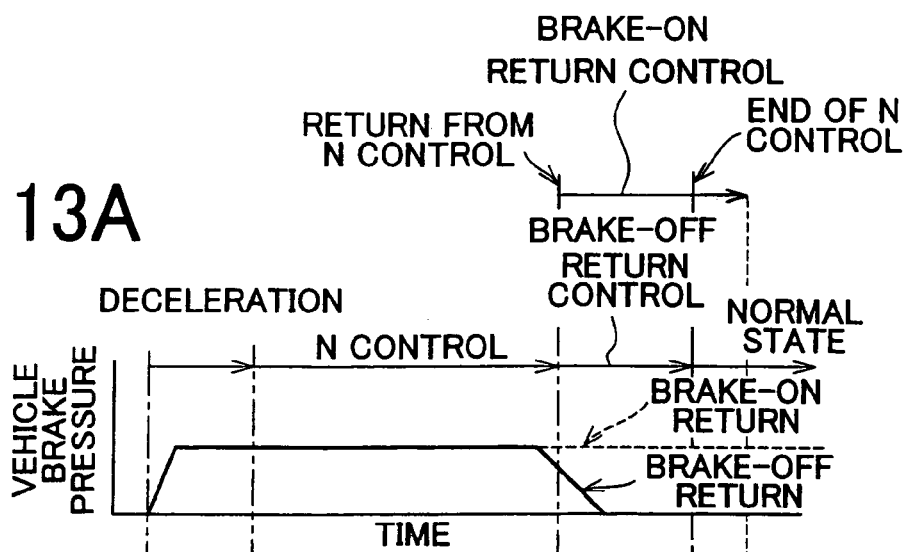
FIG. 13 is a timing chart showing the operations of the vehicle in which an automatic transmission having a control device of the third embodiment is installed.
Figure 13B:
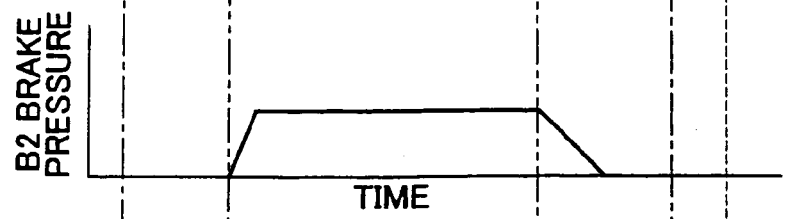
Figure 13C:
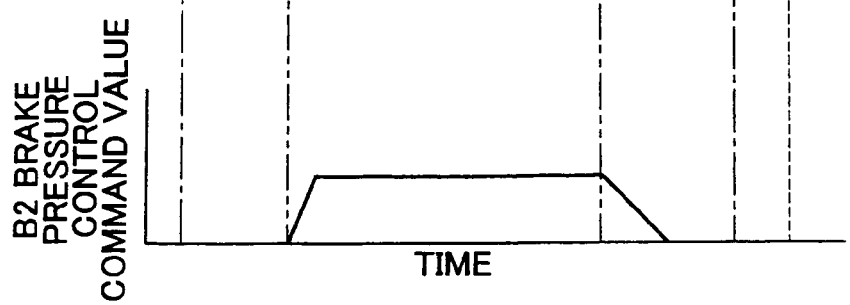
Figure 13D:
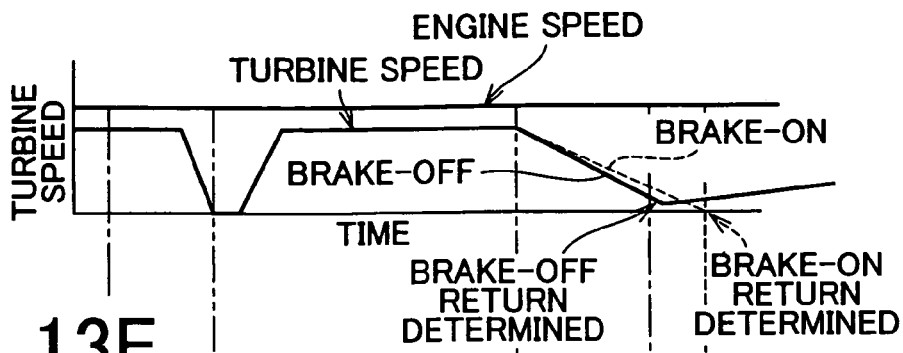
Figure 13E:
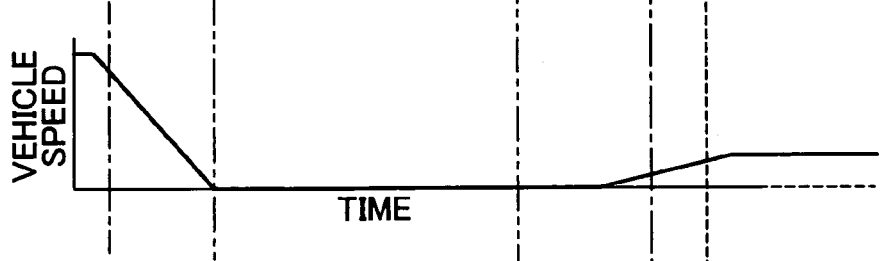

In each of the case where the brake pressure of the vehicle is reduced (i.e., the brakes are released) upon return from neutral control as indicated by the solid line in FIG. 13A, and the case where the brake pressure is kept at the same level (i.e., the brakes are applied) as indicated by the broken line in FIG. 13A, the control pressure of the input clutch (C1) 310 is controlled in a corresponding manner. If the conditions for returning from neutral control are satisfied (i.e., if "YES" is obtained in step S300), the process of returning from neutral control is executed (in step S310). If the brakes of the vehicle are not released (i.e., if "NO" is obtained in step S320), the process of correcting the return control pressure is performed (in step S330). In this case, the driver does not return the foot brake pedal 2200 to the original position, as shown in FIG. 13A.

Figure 13F:
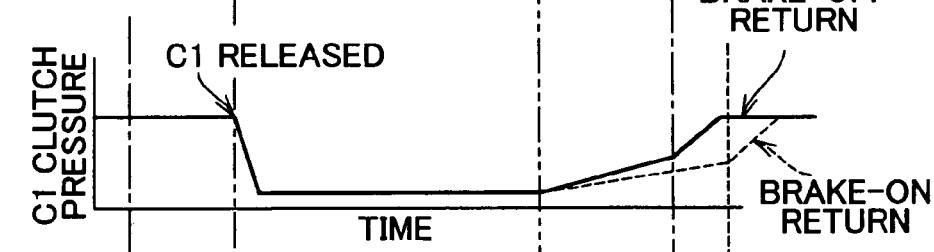
Figure 13G:
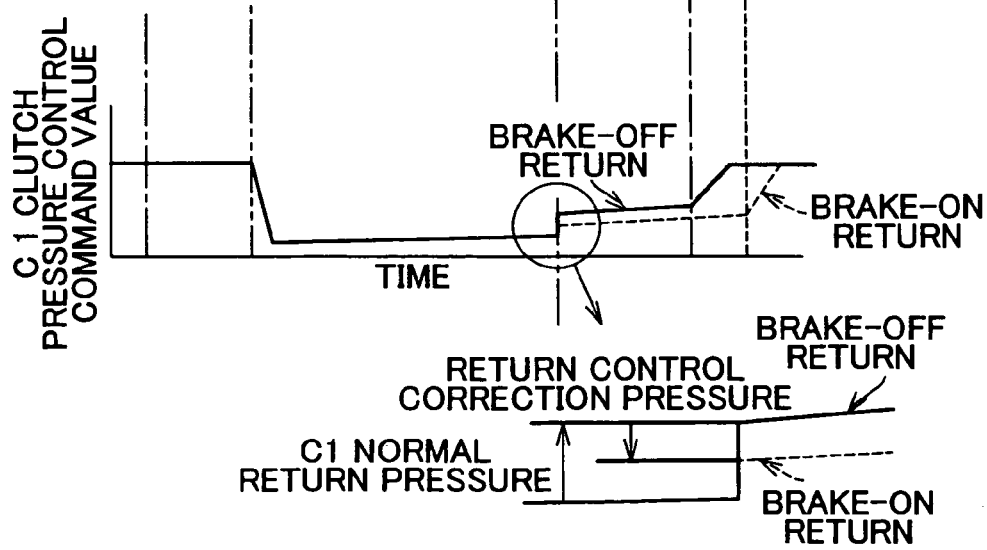

In the above case, the clutch pressure control command value of the input clutch (C1) 310 is generated as shown in FIG. 13G such that the initial engagement pressure of the clutch (C1) 310 is reduced by the return control correction pressure. Thus, the ECT_ECU 1020 generates a command signal for the engagement pressure of the input clutch (C1) 310 of the automatic transmission 300 by reducing the initial engagement pressure represented by the control command value of the input clutch (C1) 310 as shown in FIG. 13G. As a result, where the vehicle returns from neutral control with the brakes being applied (or in a brake-ON state), the clutch pressure of the input clutch (C1) 310 is slowly increased as shown in FIG. 13F, as compared with the case where the vehicle returns from neutral control with the brakes being released (or in a brake-OFF state).

With the above arrangement, when the vehicle returns from neutral control while the brake pressure of the vehicle is at a high level, the pressure of the input clutch (C1) 310 can be slowly increased as shown in FIG. 13F, so that engagement shock is avoided or suppressed, and the vehicle can be smoothly started subsequently to the neutral control.

As described above, the ECT_ECU 1020 as the control device of the present embodiment corrects the control pressure by reducing the initial engagement pressure of the input clutch when the brake pressure of the vehicle upon return from neutral control is at a high level. It is therefore possible to avoid or suppress shock upon return from neutral control and ensure good starting performance of the vehicle after the neutral control, even if the power transmitting characteristic at the time of return from neutral control and the torque ratio upon engagement of the input clutch are different between the case where the brakes are applied upon return from neutral control and the case where the brakes are released.

While the return initial pressure of the input clutch (C1) 310 upon return from neutral control is corrected based on the magnitude of the brake pressure of the vehicle in the present embodiment, the return initial pressure of the input clutch (C1) 310 upon return from neutral control may be corrected based on the presence of application of the brakes, rather than the magnitude of the brake pressure. In this case, the correction pressure of the return initial pressure to be used in the presence of application of the brakes and the correction pressure of the return initial pressure to be used in the absence of application of the brakes may be stored in a memory, in place of the map as shown in FIG. 11. Alternatively, the return initial pressure value to be used in the presence of application of the brakes and the return initial pressure value to be used in the absence of application of the brakes may be stored in the memory.

In the present embodiment, the brake pressure of the vehicle and/or the braking action of the vehicle may be detected based on the speed of the vehicle.

OTHER EMBODIMENTS

Other embodiments of the invention will be hereinafter described.

When the braking force of the vehicle is controlled upon return from neutral control, variations in the output torque of the engine 100 may be taken into consideration. If the torque of the engine 100 is large, the period of time for which the braking force is reduced is increased. This is because it takes a relatively long time to engage the input clutch (C1) 310 when the torque of the engine 100 is large.

Also, the braking force of the vehicle may be controlled in accordance with the speed ratio of the torque converter 200. The period of time for which the braking force is reduced is increased as the speed ratio is higher, so that shock can be reduced.

The braking force of the vehicle may be controlled in accordance with the speeds of rotation of the engine and the transmission or changes in the engine and transmission speeds. When the turbine speed NT is high, the brakes are slowly released. When the rate of change of the turbine speed ($\Delta NT$) is large, it is determined that the engagement of the input clutch (C1) 310 is in progress, and therefore the brakes are rapidly released. Also, the braking force of the vehicle may be controlled according to the oil temperature of the hydraulic fluid of the automatic transmission 300.

Namely, if the oil temperature of the hydraulic fluid is low, the engagement of the input clutch (C1) 310 is delayed, and therefore the period of time for which the braking force is reduced is further increased or extended.

The braking force of the vehicle may be controlled in accordance with the slope of the road. As the slope of the road is steeper or larger, the vehicle is more likely to move backward, and therefore the time of reduction of the braking force is further increased or extended.

The control of the braking force of the vehicle may be switched depending upon the acceleration stroke or throttle opening. More specifically, when the accelerator pedal is depressed during return from neutral control, which results in a change in the acceleration stroke or throttle opening, the control device immediately switches from the neutral control to the process of starting the vehicle without performing control for prolonging release of the brakes as described above.

The braking force of the vehicle may be controlled in accordance with the engagement pressure of the input clutch (C1) 310. For example, if it is determined based on a control command pressure applied to the input clutch (C1) 310 that the engagement of the input clutch (C1) has proceeded to a certain extent, the vehicle brakes are quickly released.

The second embodiment and the third embodiment may be modified as follows. Instead of changing the initial engagement pressure in the automatic transmission 300 according to the speed of reduction of the braking force of the vehicle, the rate of increase of the engagement pressure, as well as the initial engagement pressure itself, may be changed. Also, the engagement of the input clutch (C1) 310 may be controlled in accordance with the slope of the road. More specifically, the speed of engagement of the input clutch (C1) 310 is reduced if the vehicle is on a downhill, and the engagement speed is increased if the vehicle is on an uphill.

The second and third embodiments may also be modified as follows. If the accelerator pedal is depressed by the driver when the vehicle returns from neutral control, and the accelerator pedal position or throttle opening is changed, the engagement command pressure is rapidly increased so as to quickly engage the input clutch (C1) 310 to start the vehicle.

While some embodiments of the invention have been described above, for the illustrative purpose only, it is to be understood that the invention is not limited to the details of the illustrated embodiments, but may be embodied with various changes, modifications or improvements, which may occur to those skilled in the art without departing from the spirit and scope of the invention.

What is claimed is:

1. A start control device for a vehicle in which an automatic transmission having a coupling element that is engaged upon a start of the vehicle is installed, the vehicle being subjected to neutral control for releasing the coupling element when the vehicle is stopped with predetermined conditions satisfied while the automatic transmission is in a forward drive position, comprising:
   a detecting unit that detects a speed of releasing of the brakes when the vehicle returns from the neutral control; and
   a control unit that controls a braking force of the vehicle when the vehicle returns from the neutral control, based on the speed of releasing of the brakes detected by the detecting unit.

2. The start control device according to claim 1, wherein the control unit controls the braking force such that a period of time for which the braking force is reduced during return from the neutral control is increased as the speed of releasing the brakes upon return from the neutral control is higher.

3. A start control device for a vehicle in which an automatic transmission having a coupling element that is engaged upon a start of the vehicle is installed, the vehicle being subjected to neutral control for releasing the coupling element when the vehicle is stopped with predetermined conditions satisfied while the automatic transmission is in a forward drive position, comprising:
   a detecting unit that detects a magnitude of braking force during the neutral control; and
   a control unit that controls a braking force of the vehicle when the vehicle returns from the neutral control, based on the magnitude of the braking force detected by the detecting unit.

4. The start control device according to claim 3, wherein the control unit controls a speed of reduction of the braking force during return from the neutral control.

5. The start control device according to claim 4, wherein the control unit controls the braking force such that a period of time for which the braking force is reduced during return from the neutral control is increased as a braking force during the neutral control detected by the detecting unit is smaller.

6. A start control device for a vehicle in which an automatic transmission having a coupling element that is engaged upon a start of the vehicle is installed, the vehicle being subjected to neutral control for releasing the coupling element when the vehicle is stopped with predetermined conditions satisfied while the automatic transmission is in a forward drive position, comprising:
   a detecting unit that detects a speed of releasing of the brakes when the vehicle returns from the neutral control; and
   a control unit that controls an engaging state of the coupling element when the vehicle returns from the neutral control, based on the speed of releasing of the brakes detected by the detecting unit;
   wherein the control unit controls the engaging state of the coupling element such that a speed of engaging the coupling element during return from the neutral control is increased as the speed of releasing of the brakes upon return from the neutral control is higher.

7. The start control device according to claim 6, wherein the control unit changes an initial engagement pressure of the coupling element so as to increase the speed of engaging the coupling element during return from the neutral control.

8. A start control device for a vehicle in which an automatic transmission having a coupling element that is engaged upon a start of the vehicle is installed, the vehicle being subjected to neutral control for releasing the coupling element when the vehicle is stopped with predetermined conditions satisfied while the automatic transmission is in a forward drive position, comprising:
   a detecting unit that detects a magnitude of a braking force when the vehicle returns from the neutral control; and
   a control unit that controls an engaging state of the coupling element when the vehicle returns from the neutral control based on the magnitude of the braking force detected by the detecting unit; wherein the control unit controls the engaging state of the coupling element, such that a speed of engaging the coupling element during return from the neutral control is increased as the magnitude of the braking force upon return from the neutral control is smaller.

9. A start control device for a vehicle in which an automatic transmission having a coupling element that is engaged upon a start of the vehicle is installed, the vehicle being subjected to neutral control for releasing the coupling element when the vehicle is stopped with predetermined conditions satisfied while the automatic transmission is in a forward drive position, comprising:
- a detecting unit that detects whether the brakes are applied when the vehicle returns from the neutral control; and
- a control unit that controls an engaging state of the coupling unit when the vehicle returns from the neutral control, based on whether the brakes are applied,
- wherein the control unit controls the engaging state of the coupling element, such that a speed of engaging the coupling element during return from the neutral control is increased in a case where the brakes are not applied as compared with a case where the brakes are applied.

10. The start control device according to claim 8, wherein the control unit changes an initial engagement pressure of the coupling element so as to increase the speed of engaging the coupling element during return from the neutral control.

11. A start control device according to claim 9, wherein the control unit changes an initial engagement pressure of the coupling element so as to increase the speed of engaging the coupling element during return from the neutral control.

* * * * *